United States Patent
Futaki

(10) Patent No.: US 9,635,565 B2
(45) Date of Patent: Apr. 25, 2017

(54) RADIO COMMUNICATION SYSTEM AND METHOD, RADIO TERMINAL, RADIO BASE STATION, AND OPERATION ADMINISTRATION AND MAINTENANCE SERVER DEVICE

(75) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/877,072

(22) PCT Filed: Sep. 30, 2011

(86) PCT No.: PCT/JP2011/072570
§ 371 (c)(1),
(2), (4) Date: Mar. 29, 2013

(87) PCT Pub. No.: WO2012/043796
PCT Pub. Date: Apr. 5, 2012

(65) Prior Publication Data
US 2013/0196650 A1    Aug. 1, 2013

(30) Foreign Application Priority Data
Oct. 1, 2010    (JP) .................................. 2010-224388

(51) Int. Cl.
*H04Q 7/10*    (2006.01)
*H04W 24/02*    (2009.01)
(Continued)

(52) U.S. Cl.
CPC ........... *H04W 24/02* (2013.01); *H04W 24/10* (2013.01); *H04W 24/08* (2013.01)

(58) Field of Classification Search
CPC ..... H04W 24/02; H04W 24/04; H04W 24/08; H04W 28/02; H04W 24/10
(Continued)

(56) References Cited

U.S. PATENT DOCUMENTS 6,445,917 B1 *   9/2002  Bark et al. .................... 455/423
7,437,176 B1 *  10/2008  Ribas et al. .................. 455/522
(Continued)

FOREIGN PATENT DOCUMENTS

CN       101420711 A   4/2009
EP         2219413 A1   8/2010
(Continued)

OTHER PUBLICATIONS

3GPP TR 36.805 v9.0.0, 2009Study on Minimization of drive-tests in Next-Generation Networks (Release 9), 24 pgs.
(Continued)

*Primary Examiner* — Ajit Patel
*Assistant Examiner* — Julio Perez
(74) *Attorney, Agent, or Firm* — Sughrue Mion, PLLC

(57) ABSTRACT

Provided is a system in which a radio station, measures and records in accordance with the measurement instruction information, and reports to the radio station, wherein the radio terminal, in case of a first condition on selection or detection of a first cell (allowed cell) in which the radio terminal is allowed to be served for a predetermined service being satisfied, and a second condition on measurement or logging being satisfied, logs information on a second cell (not allowed cell) in which the radio terminal is not allowed to be served for the predetermined service.

26 Claims, 23 Drawing Sheets

(51) Int. Cl.
*H04W 24/10* (2009.01)
*H04W 24/08* (2009.01)

(58) Field of Classification Search
USPC ................................ 455/423, 421.1, 422
See application file for complete search history.

(56) References Cited

U.S. PATENT DOCUMENTS

| | | | | |
|---|---|---|---|---|
| 8,478,200 | B2* | 7/2013 | Kim | H04W 24/10 370/335 |
| 2005/0009521 | A1 | 1/2005 | Preece | |
| 2008/0009279 | A1 | 1/2008 | Sakawa | |
| 2009/0264077 | A1 | 10/2009 | Damnjanovic | |
| 2010/0311421 | A1* | 12/2010 | Mach | 455/436 |
| 2011/0195707 | A1* | 8/2011 | Faerber et al. | 455/423 |
| 2012/0040621 | A1* | 2/2012 | Jung et al. | 455/67.11 |
| 2012/0295650 | A1* | 11/2012 | Futaki et al. | 455/507 |

FOREIGN PATENT DOCUMENTS

| | | |
|---|---|---|
| RU | 2378794 C2 | 1/2010 |
| WO | 2009/056028 A1 | 5/2009 |
| WO | 2009/129413 A2 | 10/2009 |
| WO | 2010109302 A1 | 9/2010 |

OTHER PUBLICATIONS

3GPP TS 37.320 v1.0.0, 2010, Universal Terrestrial Radio Access (UTRA) and Evolved Radio measurement collection for Minimization of Drive Tests (MDT); Overall Description; Stage 2 (Release 10), 15 pgs.
3GPP TSG-RAN WGC Meeting #70bi5, R2-103942, 2010, [70#12]LTE CA: Measeurement Object Swapping, 8 pgs.
3GPP TS 25.133 v4.0.0, 2001, Requirements for Support of Radio Resource Management (FDD) (Release 4), 109 pgs.
3GPP TS 36.133 v9.4.0, 2010, Evolved Universal Terrestrial Radio Access (E-UTRA); Requirements for support of radio resource management (Release 9), 377 pgs.
3GPP TS 36.304 v9.3.0, 2010, Evolved Universal Terrestrial Radio Access (E-UTRA); User Equipment (UE) procedures in idle mode (Release 9), 32 pgs.
3GPP TS 36.300 v9.4.0, 2010, Evolved Universal Terrestrial Radio Access (E-UTRA) and Evolved Universal Terrestrial Radio Access Network (E-UTRAN); Overall description; Stage 2 (Release 9), 170 pgs.
3GPP TR 21.905 v9.4.0, 2009, Vocabulary for 3GPP Specifications (Release 9), 57 pgs.
3GPP TSG-RAN2 Meeting #71, R2-104840, 2010, on the need of MDT logging during OOS, 3 pgs.
3GPP TSG-RAN WG2 Meeting #71, R2-104644, 2010, Support of logged MDT in OOS, 2 pgs.
3GPP TSG RAN WG1 Meeting #62, R1-104629, 2010 Discussion on Static/Dynamic Home eNB ICIC, 4 pgs.
3GPP TSG RAN WG2 Meeting #71, R2-104538, 2010, Handling of Logged MDT Timer, 2 pgs.
3GPP TSG RAN WG2 #71, R2-104548, 2010, MDT Logging when Out of Service, 2 pgs.
International Search Report for PCT/JP2011/072570 dated Nov. 1, 2011 English Translation.
Communication dated Apr. 3, 2015 from the State Intellectual Property Office of the People's Republic of China in counterpart application No. 201180047743.9.
Communication dated Sep. 17, 2015 from the Russian Patent Office in counterpart application No. 2013120314/07(030120).
Communication dated Mar. 24, 2016, issued by the European Patent Office in corresponding European Application No. 11829349.7.
Nokia Siemens Networks, Nokia Corp, "Architectures comparison", 3GPP TSG-RAN WG2 Meeting #68, Discussion and Decision, Nov. 9-13, 2009, R2-097020, 8 pgs. total.
Samsung, "Procedure for logged MDT in idle", 3GPP TSG RAN WG2 #69 bis, R2-102292, Apr. 12-16, 2010, URL: <http://www.3gpp.org/ftp/tsg_ran/WG2_RL2/TSGR2_69bis/Docs/R2-102292.zip> (Total 4 pages).
Nokia Corporation et al., "Logged MDT when UE is Out of Service", 3GPP TSG-RAN WG2 Meeting #71, R2-104493, Aug. 23-27, 2010, URL: <http://www.3gpp.org/ftp/tsg_ran/WG2_RL2/TSGR2_71/Docs/R2-104493.zip> (total 4 pages).
Communication dated Jun. 21, 2016 from Japanese Patent Office in counterpart Application No. 2015-178301.
Communication dated Jun. 26, 2014, issued by the Korean Intellectual Property Office in corresponding Korean application No. 10-2013-7009373.
Vodafone et al, "Summary of Offline Discussion MDT Logging in OOS", Discussion & Decision, 3GPP TSG RAN WG2 #71, R2-105208, Aug. 23-27, 2010, 3 pages total.
Fujitsu, "Macro UE initiated eICIC through CSG femto eNB", Discussion, 3GPP TSG-RAN1 #62, R1104883, Aug. 23-27, 2010, 3 pages total.

* cited by examiner

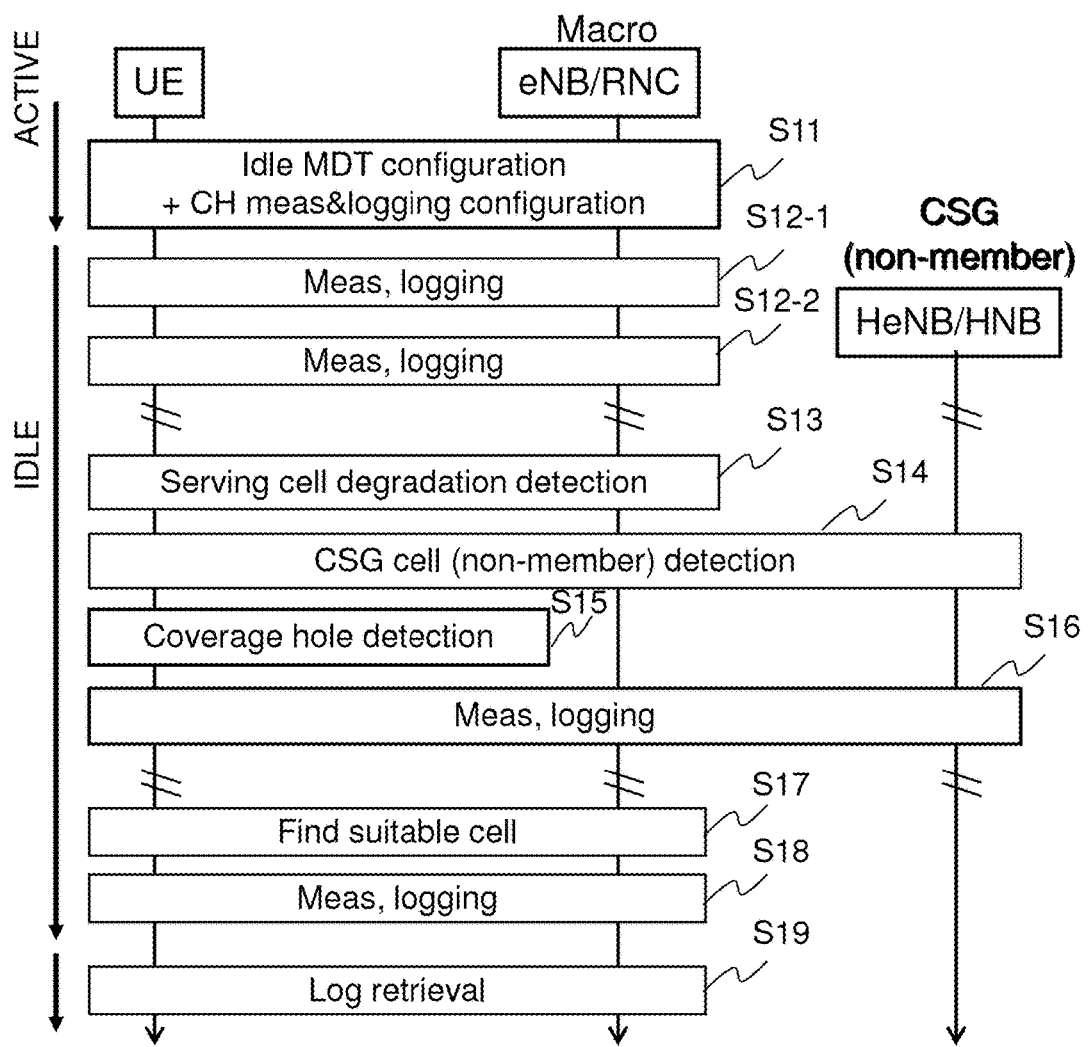

Logged MDT log (LTE EXAMPLE)

| Time | Serving cell | | Neighbouring cell(s) | |
|---|---|---|---|---|
| | ECGI | Meas result | PCI | Meas result |
| t0 | #11 | RSRP/RSRQ | #2 | RSRP |
| : | : | : | : | : |
| t1 | - | OOS | #20 | RSRP |
| : | : | : | : | : |
| t2 | #11 | RSRP/RSRQ | #2 | RSRP |
| : | : | : | : | : |
| : | : | : | : | : |

Logged MDT log (LTE EXAMPLE)

| Time | Serving cell | | Neighbouring cell(s) | |
|---|---|---|---|---|
| | ECGI | Meas result | PCI | Meas result |
| t0 | #11 | RSRP/RSRQ | #2 | RSRP |
| : | : | : | : | : |
| t1 | - | OOS | - | - |
| : | : | : | : | : |
| t2 | #11 | RSRP/RSRQ | #2 | RSRP |
| : | : | : | : | : |

Macro cell (ECGI#11/PCI#1)

Macro cell (ECGI#22/PCI#2)

Non-member CSG cell (ECGI#200/PCI#20)

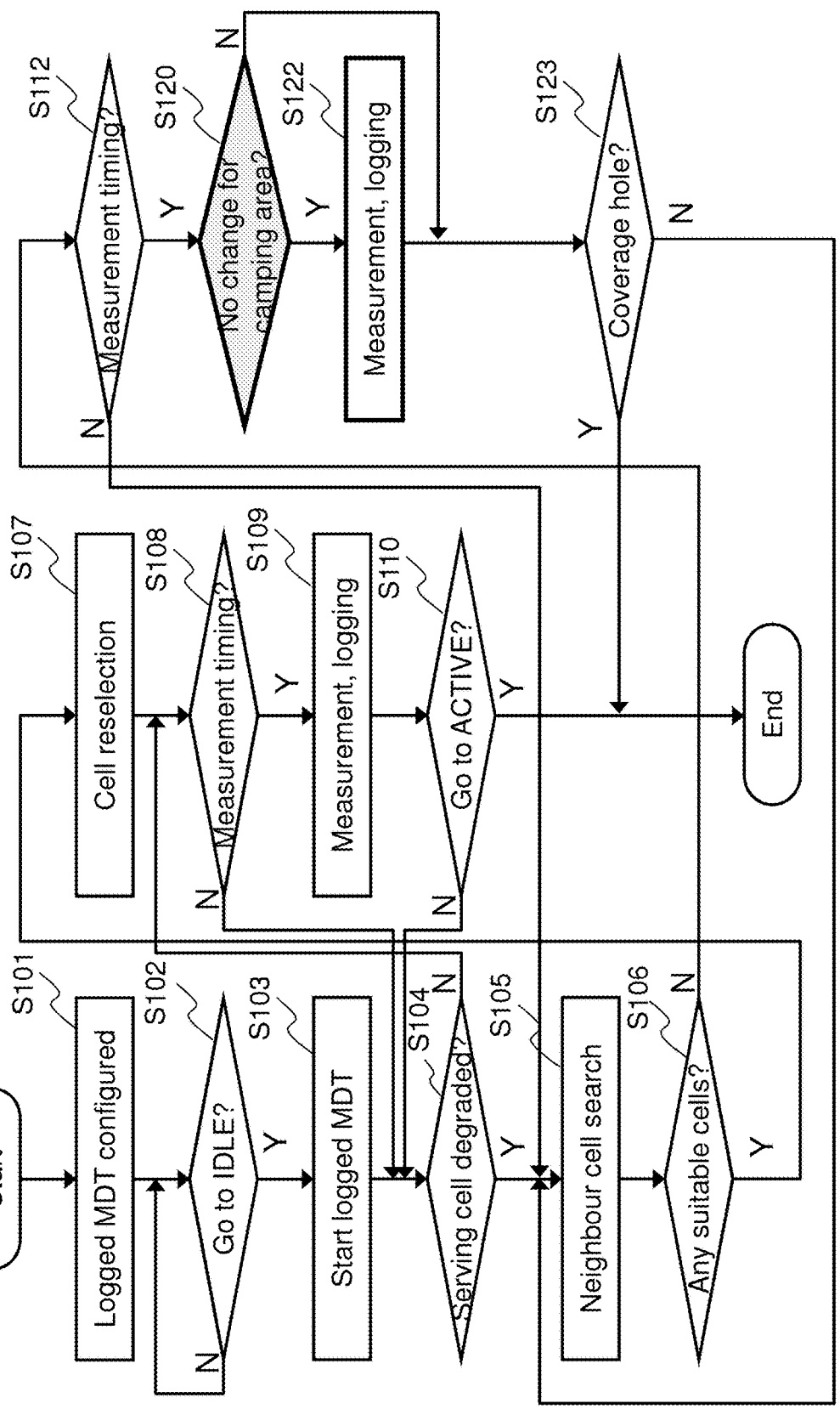

FIG. 17A  Logged MDT log (LTE EXAMPLE)

| Time | Serving cell | | Neighbouring cell(s) | |
|---|---|---|---|---|
| | ECGI | Meas result | PCI | Meas result |
| : | : | : | : | : |
| t1 | #11 | RSRP/RSRQ | #2 | RSRP |
| : | : | : | : | : |
| t2 | - | OOS | - | - |
| : | : | : | : | : |
| t3 | #22 | RSRP/RSRQ | #1 | RSRP |
| : | : | : | : | : |
| : | : | : | : | : |

Logged MDT log (LTE EXAMPLE)

| Time | Serving cell | | Neighbouring cell(s) | |
|---|---|---|---|---|
| | ECGI | Meas result | PCI | Meas result |
| t0 | #22 | RSRP/RSRQ | #1 | RSRP |
| : | : | : | : | : |
| t1 | #11 | RSRP/RSRQ | #2 | RSRP |
| : | : | : | : | : |
| t2 | - | OOS | #20 | RSRP |
| : | : | : | : | : |
| t3 | #11 | RSRP/RSRQ | #2 | RSRP |
| : | : | : | : | : |
| : | : | : | : | : |

RADIO COMMUNICATION SYSTEM AND METHOD, RADIO TERMINAL, RADIO BASE STATION, AND OPERATION ADMINISTRATION AND MAINTENANCE SERVER DEVICE

CROSS REFERENCE TO RELATED APPLICATIONS

This application is a National Stage of International Application No. PCT/JP2011/072570 filed Sep. 30, 2011, claiming priority based on Japanese Patent Application No. 2010-224388 filed Oct. 1, 2010, the contents of all of which are incorporated herein by reference in their entirety.

BACKGROUND

Radio coverage information is important in network planning, network optimization, optimization of radio resource management (Radio Resource Management: RRM) parameters and the like (Non Patent Literature 1) and a drive-test is performed by an operator in order to detect coverage problems within a network, such as a coverage hole, pilot pollution and the like. In the 3GPP (3rd Generation Partnership Project), in order to reduce operation expenditure (OPEX) incurred in a drive-test by an operator, utilization of a radio terminal (User Equipment: UE) for measurement and report of such information that has been collected by the drive-test or information similar thereto is under study (Non Patent Literature 1).
<MDT>
An ultimate object of the abovementioned study is the minimization of execution of the drive-tests (Minimization of Drive-Tests: abbreviated as "MDT"). In the MDT studies, the following are being discussed:
how a radio terminal is made to perform measurement, and
how a radio terminal is made to report a log of results of measurement or of past measurement results; where "measurement" includes not only measurement of channel quality, but also operations of "detecting" a certain specific situation, such as a radio coverage problem.
A radio network to which a radio terminal (UE) makes a report includes an (E-)UTRAN base station ((e)Node B), or an UTRAN base station control station (Radio Network Controller: RNC), or the like. An E-UTRAN base station eNB includes some functions of an RNC that manages radio resources and a base station NodeB that terminates a radio interface in an UTRAN. An E-UTRAN eNodeB or an UTRAN NodeB and RNC are denoted as "eNB/RNC" in the present specification.
(E-)UTRAN: (Evolved-)UMTS (Universal Mobile Telecommunications System) Terrestrial radio Access Network)
eNode B: evolved Node B (eNB)
<Logged MDT>
At present (at the time of filing the present application), in one measurement mode specified in the specification of Non Patent Literature 2, there is a method (Logged MDT) in which a radio terminal (UE) is made to perform measurement while in an idle mode and is made to report a measurement result to a radio network while in an active mode. In the following, as a premise for understanding of the present invention, an outline of Logged MDT is described, based on the specification of Non Patent Literature 2 and the like.
The idle mode is a power supply ON mode such as when the radio terminal (UE) is in a standby mode or the like, and is referred to as a mode in which an RRC (Radio Resource Control) connection is not established (Non Patent Literature 8). The idle mode indicates RRC_IDLE (Radio Resource Control IDLE) in LTE (Long Term Evolution) and UTRAN IDLE in UMTS (Universal Mobile Telecommunications System). When the radio terminal (UE) is in the idle mode, management as to in which serving cell the radio terminal (UE) is, is not performed. In LTE, management is performed as to in which Tracking Area (TA) the radio terminal (UE) camps (the TA is managed by an MME (Mobility Management Entity) or the like), and in UMTS, management is performed as to in which Location Area (LA) or Routing Area (RA) the radio terminal (UE) camps (the LA or RA is managed by an MSC (Mobile Switching Center)/VLR (Visitor Location Register)). It is to be noted that that in 3GPP, UMTS a CELL_PCH or URA_PCH state may be considered a target for a Logged MDT. The following describes Logged MDT focusing on an idle mode, but the basic situation is similar also for CELL_PCH or URA_PCH.

A radio base station/base station control station (eNB/RNC) of an (E-)UTRAN instructs a radio terminal (UE) in an active mode to execute measurement in an idle mode and to record measurement results (logging). That is, the radio base station/base station control station (eNB/RNC) of an (E-)UTRAN transmits an Idle MDT configuration message including a configuration parameter of a Logged MDT executed by a radio terminal (UE) in an idle mode to the radio terminal (UE) (Non Patent Literature 2). (This is a general term for UMTS/LTE, and in case of focusing on LTE, may be also called "Idle Logging Configuration message").

After transitioning from an active mode to an idle mode, the radio terminal (UE) executes measurement and logging in the idle mode, in accordance with an instruction from the (E-)UTRAN. Here, a cell that is a target for measurement is basically the same as a UE in a normal idle mode. That is, measurement in a Logged MDT follows the principle of measurement in an idle mode of a radio terminal (UE) (Non Patent Literature 4, 5).

Basically, a target for measurement is:
a cell included in a neighboring cell list,
a cell besides a neighboring cell list and detected by a UE (a detected cell).
A non measurement target is:
a cell in a black list,
a CSG (Closed Subscriber Group) cell when "PCI/PSC split" is applied to distinguish a CSG cell and an Open cell, by physical cell identification information (PCI/PSC) (applicable to a radio terminal (UE) that is a non CSG member, not having functionality/authority belonging to a CSG cell).
It is to be noted that the black list is a list of cells that is used to prevent the radio terminal from performing measurement (quality measurement) of a specific neighboring cell in the list.
A CSG cell restricts connections to a radio terminal (UE) of a specific group, such as the owner of a femto base station (Femto (e)NB or Home (e)NB) or its family, for example. Therefore, an open cell is a cell that all UEs of an operator can use, only specific radio terminals (UEs) can use CSG, and a hybrid cells is a mixture of open and CSG cells.
<Coverage Hole>
It is under study that in case of a radio terminal (UE) being camped in a coverage hole, the radio terminal (UE) performs logging as "Out Of Service" (OOS) (outside of operation area), instead of logging measurement results of a serving cell or neighboring cell (Non Patent Literature 3).

On the other hand, it is also under study that in case of a radio terminal (UE) being camped in a coverage hole, the radio terminal (UE) continues MDT measurement and Logging only in a specific time-period (for example, while a terminal is in a "camped normally" state) and suspends MDT measurement and Logging, in case of the radio terminal remaining camped in a coverage hole even after the specific time period has elapsed (for example, while the terminal is in an "any cell selection" or "camped on any cell" state) (Non Patent Literature 2). In a case where when the radio terminal returns again to a "camped normally" state, an Idle MDT Configuration is valid, the radio terminal restarts MDT measurement and Logging.

Here, a coverage hole is an area in which SNR (Signal to Noise Ratio) or SINR (Signal to Interference and Noise Ratio) of a serving cell or a neighboring cell for which serving (connection, also referred to as "establishment of a radio link") is allowed in order to perform a predetermined service, is less than a preset value necessary for maintaining basic service (establishing an SRB (Signaling radio Bearer), and acquiring information to be sent by DL common channels (downlink common channels)). Here, the SRB is a bearer for carrying an RRC (Radio Resource Control) message, which is a control message.

As to a point in time when a radio terminal (UE) determines a coverage hole, the following may be cited as examples:

a case where it is not possible to select a cell in which the radio terminal (UE) is allowed to be served in order to perform a predetermined service during when the radio terminal (UE) is in a "camped normally" state (broadcast (or paging) information could not be acquired), a case where it is not possible to select a cell in which the radio terminal (UE) is allowed to be served during when the radio terminal (UE) is in an "any cell selection" state, a case where it is not possible to select a cell in which the radio terminal (UE) is allowed to be served in order to perform a predetermined service during when the radio terminal (UE) is in a "camped on any cell" state.

In the present specification, it is assumed as an example that a coverage hole is determined in a case where it is not possible to select a cell in which a radio terminal (UE) is allowed to be served in order to perform a predetermined service during when the radio terminal (UE) is in a "camped normally" state.

<Allowed Cell/Radio Base Station>

A cell/radio base station in which a terminal is allowed to establish a radio link with the radio base station for performing a predetermined service, is called an allowed cell/radio base station in the present specification. Conversely, a cell/radio base station in which a terminal is not allowed to establish a radio link with the radio base station for performing a predetermined service, but is allowed to be served only for receiving a restricted service, and/or, a cell/radio base station in which a terminal is inhibited from being served, is called a "not allowed cell/radio base station" in the present specification. The latter, for example, corresponds to a CSG cell for a non-member.

A radio terminal (UE) for which a Logged MDT is configured performs measurement in an idle mode, notifies an (E-)UTRAN that the radio terminal (UE) holds a log, at a point in time when the radio terminal (UE) goes into an active mode and establishes an RRC connection, and responsive to an instruction to report the log from the (E-)UTRAN, makes a report.

A radio terminal (UE), which is made from a radio network side to execute MDT measurement and logging in an idle mode, by using 1 bit in a connection complete (RRC_CONNECTION Setup Complete) message, for example, at a time of establishment of an RRC connection in a transition to an RRC_CONNECTED state in LTE, gives an indication to the radio network side that an MDT measurement result is available. The radio network retrieves a log of the measurement results based on the indication. For example, a radio base station (eNodeB: eNB) of the E-UTRAN transmits a UE Information Request to the radio terminal (UE) in order to perform log retrieval (collection) and the radio terminal (UE) reports a log of the measurement results as a UE Information Response.

Thus, it is possible for an (e)NodeB/RNC or an upper level network server (Core Network: abbreviated as "CN", or Operation Administration and Maintenance: abbreviated as "OAM") to comprehend a coverage problem. Retrieving a log(measurement result) held by a radio terminal (UE) from the network, and reporting the held log(measurement result) from the radio terminal is termed as log retrieval (collection), in the present specification.

Below, an LTE system is assumed, and using FIG. 22, an example of operations of a radio terminal (UE) is given.

The radio terminal (UE) that receives an instruction to execute periodic measurement of a Logged MDT, from an eNodeB in LTE, goes into an idle mode (RRC_IDLE) at time t=t0. At this time the radio terminal (UE) is assumed to camp in cell 1.

At time t=t0, the radio terminal (UE) performs logging of measurement results (RSRP and/or RSRQ) of serving cell 1 and neighboring cell 2.

At t=t1, the radio terminal (UE) cannot select a connectable cell during a preset time-period, and detects a coverage hole and suspends measurement. Thereafter, while in a state where a connectable cell cannot be selected, instead of a measurement result, logging of "OOS" (out of service) may be performed. In a case where it is possible to select cell 1 once again or another connectable cell, the radio terminal (UE) restarts MDT measurement.

The radio terminal (UE) moves to cell 2 in an idle mode, and at t=t2, performs logging of measurement results of cell 2 (serving cell) and neighboring cell 1.

At t=t3, the radio terminal (UE) goes into an active mode (RRC_CONNECTED), and reports the log retained by the radio terminal (UE) to the base station eNodeB2 of cell 2.

Thus, in a case where the UE detects a coverage hole, by reporting received quality until the coverage hole is detected or the fact (OOS) that there is a coverage hole to the eNodeB, it is possible to execute a required solution such as coverage optimization, based on the relevant fact, by the eNodeB or an upper level network server such as the OAM.

[NPL 1]
3GPP TR36.805 v9.0.0
(Internet <http://www.3gpp.org/ftp/Specs/html-info/36805.htm>)
[NPL 2]
R2-105238 (3GPP TS37.320 v1.0.0 (2010-08))
(Internet <http://www.3gpp.org/ftp/tsg_ran/WG2_RL2/TSGR2_71/Docs/R2-105238.zip>)
[NPL 3]
R2-103942
(Internet <http://www.3gpp.org/ftp/tsg_ran/WG2_RL2/TSGR2_70bis/Docs/R2-103942.zip>
[NPL 4]
3GPP TS25.133 v4.0.0 (2001-03)
(Internet <http://www.3gpp.org/ftp/Specs/archive/25_series/25.133/25133-400.zip>)

[NPL 5]
3GPP TS36.133 V9.4.0 (2010-06)
(Internet <http://www.3gpp.org/ftp/Specs/archive/36_series/36.133/36133-940.zip>)
[NPL 6]
3GPP TS36.304 v9.3.0
(Internet <http://www.3gpp.org/ftp/Specs/html-info/36304.htm>)
[NPL 7]
3GPP TS36.300 v9.4.0
(Internet <http://www.3gpp.org/ftp/Specs/html-info/36300.htm>)
[NPL 8]
3GPP TS21.905 v9.4.0
(Internet <http://www.3gpp.org/ftp/Specs/html-info/21905.htm>)

SUMMARY

Results of an analysis of problems in related technology are as follows.

In the related technology, a determination by a radio terminal (UE) as to whether or not there is a coverage hole, targets only an allowed cell/eNodeB. Accordingly, in case of a determination of a coverage hole, information understood on a radio network side is that "there is no allowed cell".

However, even in a case where the UE determines that there is a coverage hole, received quality of a downlink pilot signal from all radio base stations in the neighborhood is not necessarily below a value required for performing basic service (and thus it is not possible to establish an SRB or acquire system information).

For example, there may be a situation in which "there is no allowed cell but there is a not allowed cell", that is, a case where received quality of a not allowed cell is greater than or equal to a preset value, but the radio terminal is not able to be served by the cell. Specifically, in the following three cases, for example, it is assumed that the situation described above occurs.

Case 1)

As shown in FIG. 23A, in a heterogeneous network (HetNet) including a macro cell and a CSG cell, when a radio terminal (UE) is within the non-member CSG cell which the radio terminal (UE) is not allowed to be served by (connected to) or at a boundary of the macro cell and the non-member CSG cell. It is to be noted that in place of the macro cell, the same applies to a micro cell or a pico cell. In the present specification, as a typical example, descriptions focus on a macro cell.

Case 2)

As shown in FIG. 23B, when a radio terminal (UE) is at a boundary with a black list cell which the radio terminal (UE) is not allowed to be served by (connected to) (for example, a river, an enclave of upper floors of a building, or the like).

Case 3)

When a radio terminal (UE) is at a boundary with a barred cell in which serving (connection) is forbidden to the radio terminal (UE) or inside the barred cell.

In this way, causes for a coverage hole differ according to situations.

In existing related technologies, the causes for a coverage hole cannot be distinguished on a radio network side. That is, even if a report of a measurement result at a time when a coverage hole is detected, or a report (OOS) of detection of a coverage hole, is received from the radio terminal, the radio network side cannot comprehend a situation (specifically, the abovementioned cases 1 and 2) of "there is no allowed cell but there is a not allowed cell". That is, the radio network side cannot correctly identify the cause for a coverage hole.

Consequently, it may be uniformly determined that the cause for a coverage hole, for example, is a macro cell coverage problem, and a method of dealing with the coverage hole may be decided and executed. As a result, an adverse situation occurs where inappropriate handling of the coverage hole is performed on the radio network side, and a coverage problem due to inter-cell interference cannot be solved.

Accordingly, it is an object of the present invention to provide a system, method, and device that enable identification of the cause of defect in radio coverage detected by a radio terminal (UE) on a radio network side.

The present invention is outlined as in the following configuration.

According to the present invention there is provided a radio communication system, wherein a radio terminal, upon acquiring measurement instruction information from a radio station (such as a radio base station/base station control station, though not limited thereto), performs measurement and logging in accordance with the measurement instruction information, and reports to the radio station, the radio terminal comprising:

a measurement execution unit that, when finding that a first condition on selection or detection of a first cell in which the radio terminal is allowed to be served for a predetermined service, is satisfied, and a second condition on measurement or logging is satisfied, logs information on a second cell in which the terminal is not allowed to be served for the predetermined service.

According to the present invention there is provided a radio terminal that receives measurement instruction information transmitted from a radio station and performs measurement and logging in accordance with the measurement instruction information, the radio terminal comprising:

a measurement execution unit that, in case of a first condition on selection or detection of a first cell in which the terminal is allowed to be served for a predetermined service being satisfied, and a second condition on measurement or logging being satisfied, logs information on a second cell in which the terminal is not allowed to be served for the predetermined service.

According to the present invention there is provided a radio station of a radio communication system (such as a radio base station/base station control station, though not limited thereto), wherein a radio terminal that receives measurement instruction information from the radio station performs measurement and logging in accordance with the measurement instruction information, and in case of a first condition on selection or detection of a first cell in which the radio terminal is allowed to be served for a predetermined service being satisfied, and a second condition on measurement or logging being satisfied, logs information on a second cell in which the terminal is not allowed to be served for the predetermined service, and reports to the radio station side, wherein the radio station, in a case where a report from the radio terminal that detects a situation in which detection of the first cell in which a radio terminal is allowed to be served, is not possible, indicates that the second cell in which the radio terminal is not allow to be served, is present in the neighborhood, executes a change of a network configuration of at least one of the first cell and the second cell, as a strategy for reducing interference between the first cell and the second cell, and in a case where a report from the radio terminal indicates that the second cell is not present in the neighborhood, executes a change of a network configuration related to coverage of the first cell.

According to the present invention there is provided an operation administration and maintenance server that performs operation administration and maintenance of a radio communication system, wherein a radio terminal that receives measurement instruction information from a radio station (such as a radio base station/base station control station, though not limited thereto), performs measurement and logging in accordance with the measurement instruction information, and in case of a first condition on selection or detection of a first cell in which the terminal is allowed to be served for a predetermined service being satisfied, and a second condition on measurement or logging being satisfied, logs information on a second cell in which the terminal is not allowed to be served for the predetermined service, and reports to the radio station side, wherein the operation administration and maintenance server performs control so that in a case where a report from the radio terminal that detects a situation in which detection of the first cell in which the radio terminal is allowed to be served is not possible, indicates that the second cell in which the radio terminal is not allow to be served, is present in a neighborhood, a network configuration of at least one of the first cell and the second cell is changed, as a strategy for reducing interference between the first cell and the second cell, and in a case where a report from the radio terminal indicates that the second cell is not present in the neighborhood, a network configuration related to coverage of the first cell is changed.

According to the present invention there is provided a radio communication method, wherein a radio terminal acquires measurement instruction information from a radio station (such as a radio base station/base station control station, though not limited thereto), and performs measurement and logging in accordance with the measurement instruction information and reports to the radio station, the method comprising:

the radio terminal, in case of a first condition on selection or detection of a first cell in which the radio terminal is allowed to be served for reception of a predetermined service being satisfied, and a second condition on measurement or logging being satisfied, logging information on a second cell in which the terminal is not allowed to be served for reception of the predetermined service.

According to the present invention, a radio network side can identify a cause of a coverage problem such as a coverage hole, such as whether it is due to lack of coverage or due to an interference problem, or the like.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 6 is a diagram illustrating sequence operations of a system of the second exemplary embodiment of the present invention.

FIG. 16 is a flowchart describing another example of operations of the radio terminal of the fourth exemplary embodiment of the present invention.

FIGS. 17A, 17B and 17C are diagrams illustrating an example of a log of the fourth exemplary embodiment of the present invention.

MODES

Figure 1:
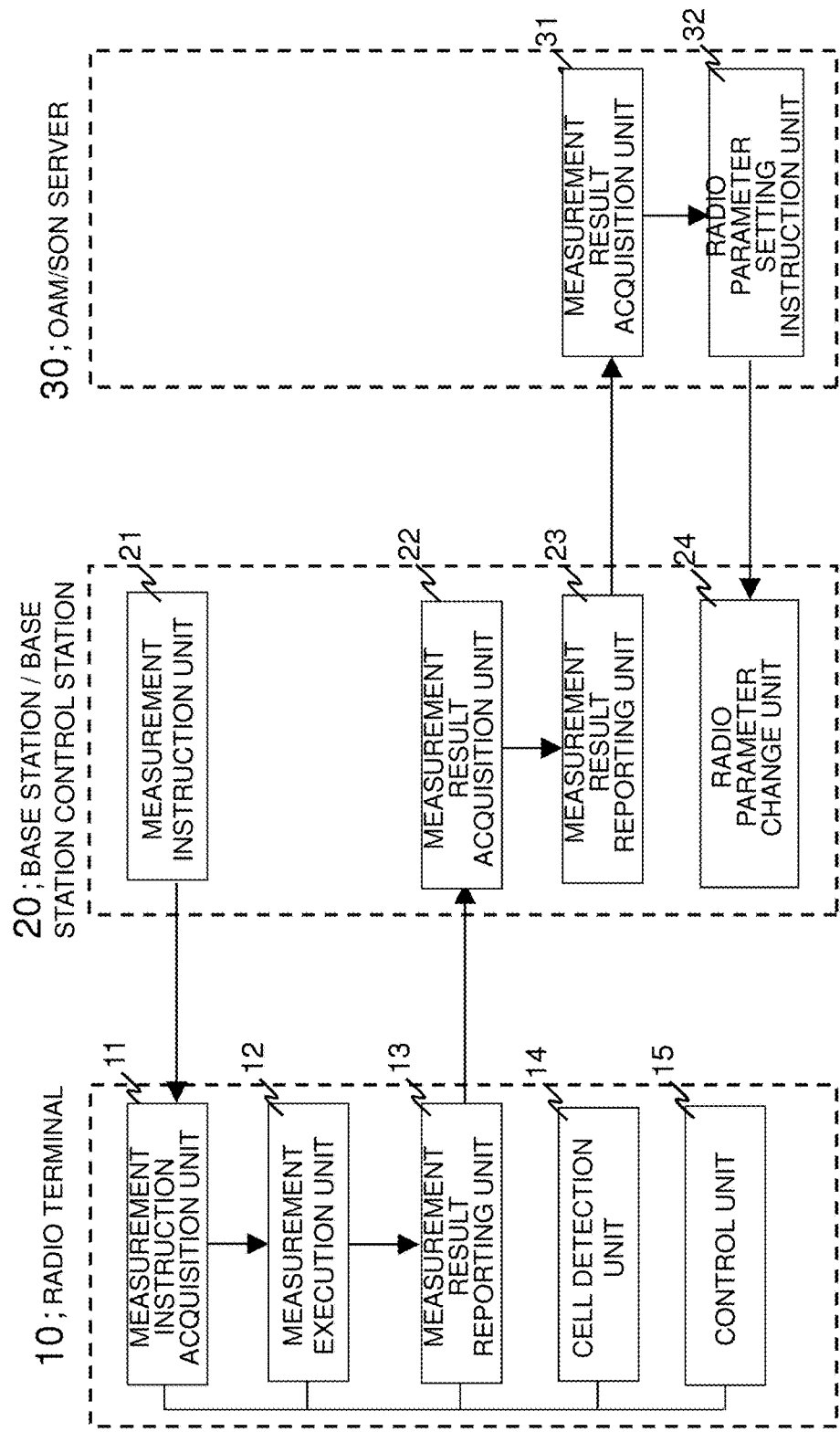
FIG. 1 is a diagram illustrating a system configuration of a first exemplary embodiment of the invention.

Exemplary embodiments of the present invention are described using a radio communication system of the 3GPP (3rd Generation Partnership Project), as an example. In one of preferable embodiments of the present invention, a radio terminal, in case of a first condition on a first cell in which the radio terminal is allowed to be served relating to a predetermined service is satisfied in an idle mode, records (logs) information on a second cell in a neighborhood in which the radio terminal is not allowed to be served relating to a predetermined service, and thereafter, when the radio terminal goes into an active mode, the radio terminal reports to a radio network, where the predetermined service, for example, may be a normal service (making a call, receiving a call, transmitting and receiving user data, and the like) supported by the radio terminal and radio network. Therefore, in this case, the first cell is, for example, a cell where a radio terminal is allowed to receive (perform) a normal service. The following describes a normal service as the predetermined service, merely as an example. It is as a matter of course that the predetermined service is not limited to this example.

The second cell is a cell in which a radio terminal is allowed to be served only for receiving a limited service, and/or a cell which the radio terminal is inhibited from being served by (being connected to). In view of definitions used in 3GPP, the first cell corresponds to a "Suitable cell", the second cell corresponds to an "Acceptable cell", and/or a "Barred cell" (Non Patent Literature 6).

It is to be noted that limited service may include an Emergency call, or an emergency report of an earthquake, tsunami, or the like (Earthquake and Tsunami Warning System: ETWS) (Non Patent Literature 7).

The "first condition" described above includes at least one of the radio terminal detects a situation in which selection of the first cell is not possible, received quality of a serving cell, in which the radio terminal is being served, no longer satisfies a cell selection criteria, a preset time-period has elapsed since received quality of a serving cell, in which the radio terminal is being served, no longer satisfied a cell selection criteria, the radio terminal transitions to a state in which detection of the second cell is performed by the radio terminal.

In particular, in a case where the radio terminal detects a situation in which the radio terminal cannot select the first cell, an area in which the radio terminal stays is called a "coverage hole".

Furthermore, the second condition on measurement or logging may be configured in advance. For example, a condition where, before (immediately before) the radio terminal satisfies the first condition, a measurement instruction (and a indicated measurement operation) was valid (was executed), a condition where, before (immediately before) the radio terminal satisfies the first condition, the last serving area belongs to a predetermined preset area, a condition where the radio terminal hold is valid location information, at a point in time when the radio terminal satisfies the first condition, or a condition where, at a point in time when the radio terminal satisfies the first condition, an area, in which received quality of a downlink given signal (pilot signal, reference signal) is maximum (highest), belongs to a preset area.

Similarly, preset timing at which information on the second cell is recorded, may be configured in advance. For example, this may be a period (interval) indicated in the measurement instruction information sent to the radio terminal from a radio network, such as a radio base station/base station control station (also termed as a radio station), a point in time at which the first condition is satisfied, or the like.

It is to be noted that a more detailed definition of a coverage hole, as supposed in 3GPP, indicates a situation in which received quality of a downlink signal (Signal to Noise power Ratio: SNR, Signal to Interference and Noise power Ratio: SINR, etc.) is less than a required value (level) for executing basic service, where the basic service indicates, for example, establishment of an SRB (Signaling Radio Bearer), acquisition of broadcasted system information (common information), and exchange of control information between a radio terminal and a radio base station, or the like. Otherwise, in LTE, Reference Signal Received Power (RSRP), and Reference Signal Received Quality (RSRQ), and in UMTS, Received Signal Code Power (RSCP) of a Common Pilot Channel (CIPICH), Ratio of energy per modulating bit to the noise spectral density (Ec/No) of a CPICH etc., are used as received quality.

Alternatively, a situation may also be called a coverage hole where a radio terminal cannot select a cell in which the radio terminal is allowed to be served for receiving a normal service, that is, the radio terminal cannot detect a cell in which the radio terminal is allowed to be served for receiving a normal service with which the radio terminal is able to acquire broadcasted system information.

Information on the second cell may be, for example:

measurement results of the second cell (received quality, cell identifier, access restriction information, or the like), information indicating presence or absence of the second cell (whether or not the second cell is present in the neighborhood), information indicating a type of the second cell (whether a cell for which only a limited service is possible, whether serving (connection) is barred), information that although received quality of a downlink pilot signal (reference signal) is greater than or equal to a preset value, and/or system information can be acquired, the cell in question is a second cell, presence or absence of a cell in which the received quality of a downlink pilot signal (reference signal) is greater than or equal to a preset value, but system information cannot be acquired, information indicating whether a cell, in which the received quality of a downlink pilot signal (reference signal) is maximum (highest), is a first cell or a second cell.

It is to be noted that access restriction information may include member information (CSG Identity (ID)) in a closed cell (Closed Subscriber Group (CSG) cell) in which radio terminals (members) allowed to be served for receiving a normal service are restricted, which is one of the service model of a Femto cell (or it may be called Home cell), information on access barring (Access Class (AC) Barring) and so forth.

In the determination as to the presence or absence of the second cell in which the radio terminal is not allowed to be served for receiving a normal service, the following may be used:

a method of recognizing in advance serving is not allowed for receiving a normal service to a specific cell in the neighborhood, and determining whether or not received quality of a downlink signal of the cell in question is greater than or equal to a preset value (for example, greater than or equal to a level required to execute basic service), a method of recognizing in advance that serving is not allowed for receiving a normal service to a specific cell in a neighborhood, and determining whether or not system information broadcasted in the cell can be acquired, a method of detecting an identifier (for example, Physical Cell ID: PCI/Primary Scrambling Code: PSC) of a neighboring cell, recognizing from the identifier whether or not serving is allowed for receiving a normal service, and determining whether or not received quality of a downlink signal of the cell in question is greater than or equal to a preset value (for example, greater than or equal to a level required in order to execute basic service), a method of detecting an identifier (for example, Physical Cell ID: PCI/Primary Scrambling Code: PSC) of a neighboring cell, recognizing from the identifier whether or not serving is allowed for receiving a normal service, and determining whether or not system information broadcasted in the cell in question can be acquired, a method of acquiring system information broadcasted in a neighboring cell and determining, based on the system information, whether or not serving is allowed for receiving a normal service.

However, the present invention is, as a matter of course, not limited to the methods listed above.

In the present specification, a cell/radio base station which a certain radio terminal (UE) is allowed to be served by (connected to), that is, is allowed to establish radio link, in order to receive (execute) a predetermined service, for example a normal service, is called an "allowed cell/radio base station". Conversely, a cell/radio base station which a certain radio terminal (UE) is not allowed to be served by (connected to) in order to receive a predetermined service, for example, a normal service, that is, a cell/radio base station with which a radio terminal (UE) is allowed to establish a radio link only in order to receive a limited service, and/or a cell/radio base station with which a radio terminal (UE) is not allowed to establish a radio link, is called a "not allowed cell/radio base station". The allowed cell corresponds to the first cell as described above, and the not allowed cell corresponds to the second cell.

It is to be noted that as to when a radio terminal (UE) determines a coverage hole, for example, there is a method of determining a coverage hole when an allowed cell cannot be selected in a preset time-period (broadcasted system information cannot be acquired, or received quality is less than a preset value). Here, the preset time-period may be:

during a "camped normally" state,
during an "any cell selection" state,
during a "camped on any cell" state, or the like.

Here, normal operations of a radio terminal (UE) in a system specified in 3GPP include:
being in a "camped normally" state while a "Suitable cell" is selected, and thereafter
transitioning to an "any cell selection" state in a case where a "suitable cell" cannot (could no longer) be selected (detected), and
transitioning to a "camped on any cell" state in a case where an "acceptable cell" could be selected (detected).

In the present specification, as an example, in a case where an allowed cell could not be selected during a "camped normally" state (that is, before transitioning to an "any cell selection" state), a determination of a coverage hole is made. However, in the present invention, the determination of the coverage hole is, as a matter of course, not limited to this in particular.

In addition, in the description of the embodiments below, basically, as the first condition on selection or detection of the first cell, it is assumed that a coverage hole is detected and that received quality of a serving cell does not satisfy a cell selection criteria, and operation of the radio terminal (UE) when these problems are detected, is described, but the embodiments are also possible to operation at a stage before the coverage hole detection, for example, during the above-mentioned preset time-period.

Objects of an idle mode may include RRC_IDLE in 3GPP LTE (Long Term Evolution), and UTRAN IDLE, CELL_PCH, URA_PCH in a 3GPP UMTS (Universal Mobile Telecommunication System). It is to be noted that, below, a description regarding a Logged MDT focuses on RRC_IDLE in LTE and UTRAN IDLE in UMTS, but the present invention can be, as a matter of course, applied also to CELL_PCH and URA_PCH.

In the operation of a radio terminal (UE) when it detects a coverage hole, in the present invention, specifically, there are two options as follows. It is to be noted that, as described above, the present invention can also be applied to a stage before the coverage hole detection, for example, as an operation during the preset time-period described above.

<Option 1>

In a case where there is a not allowed cell in a neighborhood, which a radio terminal is not allowed to receive a predetermined service, for example a normal service, the radio terminal executes measurement of the not allowed cell with regard to the predetermined service, and logs measurement result. It is to be noted that logging of the measurement result may be performed for only a case where received quality of a downlink pilot signal is greater than or equal to a preset value. Furthermore logging may be performed also as "OOS (Out Of Service)" (outside of operation range). On the other hand, in a case where there is a not allowed cell with regard to the predetermined service in the neighborhood, nothing in particular is logged, or "OOS" is logged. It is to be noted that instead of "OOS", it is possible to have information indicating a coverage hole, outside of coverage, outside service are or the like, such as "Out Of Coverage: OOC" etc., and it is, as a matter of course, not limited thereto. Here, a measurement result of a not allowed cell with regard to a predetermined service, or "OOS" or the like, is corresponding to information on the second cell described above.

<Option 2>

Neighbor information (corresponding to information on the second cell described above) of a not allowed cell in which a radio terminal is not allowed to receive a predetermined service, for example, a normal service, is logged. Furthermore "OOS" (outside of operation range) may also be logged. The following are cited as neighbor information.

(A) Presence or absence of a not allowed cell with regard to a predetermined service. In a case where a not allowed cell with regard to a predetermined service is present, information of the cell (PCI/PSC, and/or ECGI (E-UTRAN Cell Global Identifier)/CGI) is also included.

(B) Presence or absence of a cell in which received strength (RSRP/RSCP) of a downlink pilot signal is greater than or equal to a predetermined preset value, but it is not possible to acquire broadcast information. In a case where the corresponding cell is present, information of the cell (RSRP/RSCP, PCI/PSC, ECGI/CGI, and the like) is included.

(C) Information as to whether or not a cell for which received quality (RSRQ/Ec/No) of a downlink pilot signal is maximum (highest), is an allowed cell with regard to a predetermined service (or is corresponding to an immediately preceding serving cell or a neighboring cell in a neighboring cell list (NCL)), or, conversely, whether or not a cell for which the received quality (RSRQ/Ec/No) of a downlink pilot signal is maximum, is a not allowed cell.

It is to be noted that (A) concerns the presence or absence of a not allowed cell with regard to a predetermined service, (B) concerns the presence or absence of a cell for which it is not clear whether the cell is an allowed cell or a not allowed cell, with regard to a predetermined service, but the cell satisfies a preset condition, and (C) concerns information on the presence of a not allowed cell with regard to a predetermined service.

Neighborhood information thereof may include information on an allowed cell with regard to a predetermined service, and may be said to be neighbor information on a not allowed cell with regard to a predetermined service which the radio terminal is not allowed to receive (perform) the predetermined service.

Here, for example, in a Heterogeneous Network (HetNet) in which a macro base station (macro (e)NB) that manages a macro cell and a femto base station (or a H(e)NB: Home (e)NodeB) that manages a CSG cell are present, a case is assumed where a cell in which a certain radio terminal is allowed to be served is a macro cell, and a cell in which the radio terminal is not allowed to be served is a CSG cell.

On a radio network side, in a case where information indicating the presence of a not allowed cell with regard to a predetermined service is reported (together with "OOS") from a radio terminal, it is determined that the cause for a coverage hole is not a coverage problem among cells in which the radio terminal is allowed to be served (for example, among macro cells), but due to excessive interference by a cell in which the radio terminal is not allowed to be served (for example, a CSG cell or the like). In this case, technique to avoid interference among macro cells and CSG cells (adjustment of a radio parameter) is applied. Or, setting the CSG cell in question to an open cell or a hybrid cell may be conceived.

In a case where information, that indicates the presence of a not allowed cell with regard to a predetermined service, is not reported, it is determined that there is a coverage problem among the macro cells, and coverage optimization of the macro cells is applied. Regarding coverage optimization of the macro cells, any well-known optimization may be used (for example, increasing or decreasing transmission power of a pilot signal for a specific macro cell, or expanding or shrinking coverage by adjusting an antenna tilt angle).

As another example, a case is assumed where a macro cell in which a certain radio terminal is not allowed to be served, and a not allowed macro cell that bars access for the radio terminal (for an Access Class (AC) to which it belongs) are neighboring.

On the radio network side, in a case where information indicating the presence of a not allowed cell is reported (together with "OOS") from a radio terminal, it is determined that the cause for a coverage hole is due to excessive interference among an allowed cell of the radio terminal and a not allowed cell. In this case, technology for avoiding interference among the allowed macro cell and the not allowed macro cell is applied (radio parameter adjustment), or access barring in the not allowed cell in question is mitigated (canceled), and serving is allowed in order to perform a predetermined service, for example, a normal service, for the radio terminal in question.

In a case where information that indicates the presence of a not allowed cell is not reported, it is determined that there is a coverage problem among the allowed macro cells, and coverage optimization of the macro cells is applied. Regarding coverage optimization of the macro cells, any well-known optimization may be used (for example, increasing or decreasing transmission power of a pilot signal or the like for a specific macro cell, or expanding or shrinking coverage by adjusting an antenna tilt angle).

It is to be noted that in the present exemplary embodiment, a description has been given where serving is not allowed regarding a predetermined service, but the present invention can also be applied to a case where serving is not allowed regarding entirety of services.

First Exemplary Embodiment

FIG. 1 is a diagram illustrating a block configuration of a radio terminal (UE), a base station/base station control station, and an OAM (Operation Administration and Maintenance)/SON (Self Organizing Network) server, in an exemplary embodiment of the present invention. The radio terminal 10 includes a measurement instruction acquisition unit 11 that acquires a measurement instruction (Logged MDT configuration message) transmitted over a radio from a base station 20, a measurement execution unit 12 that receives a measurement instruction from the measurement instruction acquisition unit 11 and measures received quality or the like of a downlink signal, and a measurement result reporting unit 13 that reports a measurement result over a radio to the base station 20. The radio terminal 10 includes a radio unit and a baseband unit both not shown in the drawings, and includes a cell detection unit 14 that, in addition to initial cell search when a power supply is turned ON, performs search for a suitable cell such as a cell that has good received quality for a radio terminal, based on a synchronization signal, during communication, during standby, or at times of intermittent reception, and a control unit 15 that, as a control circuit, performs radio link control such as establishment of a radio link connection, connection maintenance, release of the radio link connection and the like, and in addition, performs management of idle mode/active mode, and control of respective parts.

The base station 20 includes a measurement instruction unit 21 that gives a measurement instruction to the radio terminal 10, a measurement result acquisition unit 22 that acquires a measurement result from the radio terminal 10 that has received a measurement instruction from the measurement instruction unit 21, a measurement result reporting unit 23 that reports a measurement result to the OAM/SON server 30, and a radio parameter configuration change unit 24 that performs configuration change of radio parameters (tilt angle of transmission antenna, transmission power, or the like) of the base station 20.

The OAM/SON server 30 includes a measurement result acquisition unit 31 that acquires a measurement result from the measurement result reporting unit 23 of the base station 20, and a radio parameter configuration instruction unit 32. The radio parameter configuration instruction unit 32 gives a radio parameter configuration instruction to the base station 20. It is to be noted that in the present exemplary embodiment, a description is given in which the OAM/SON server 30 gives an instruction for radio parameter configuration to the base station 20, but an embodiment is also possible in which the base station decides radio parameters, and notifies the decided radio parameters to another base station.

Figure 2:
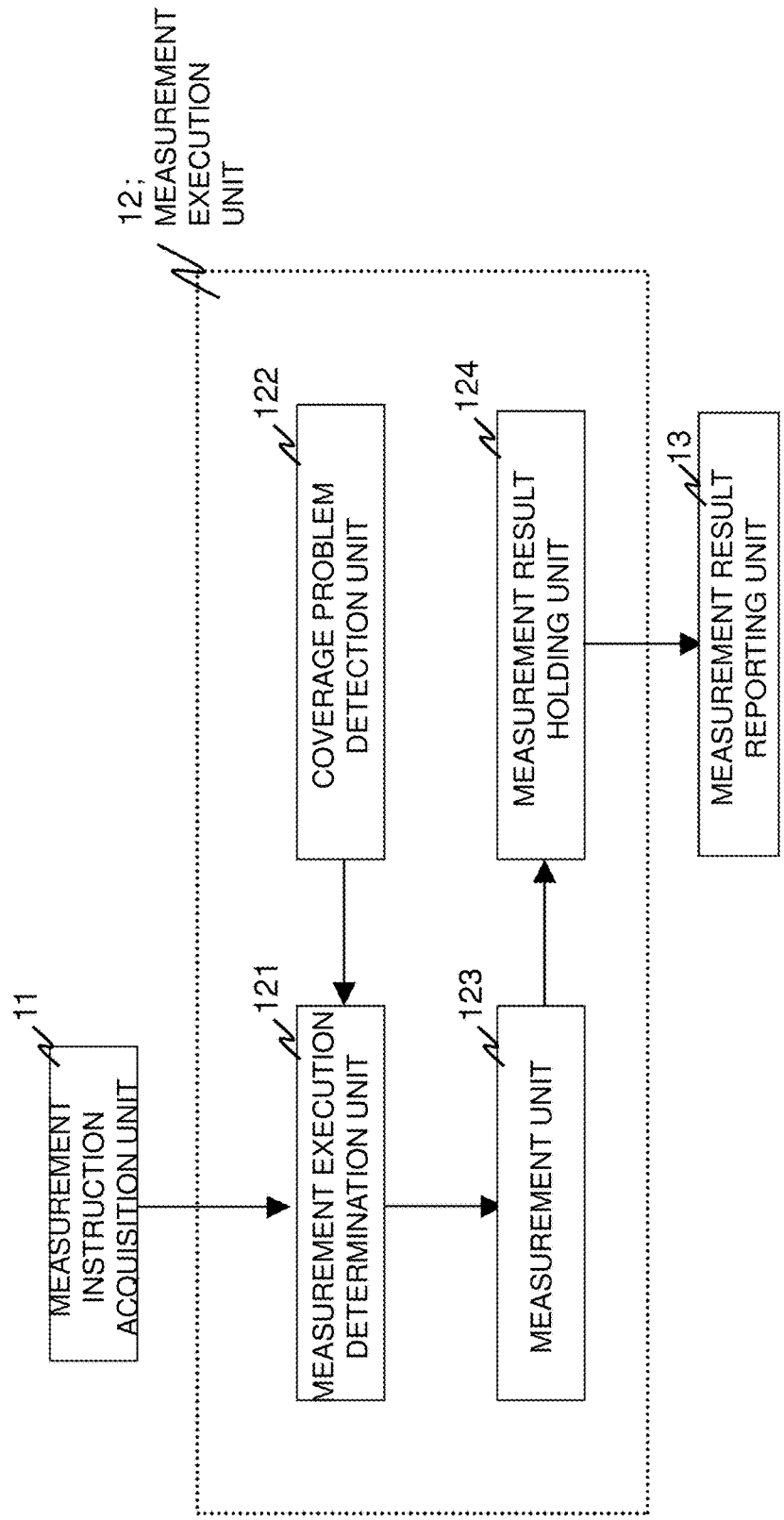
FIG. 2 is a diagram illustrating an arrangement of a measurement execution unit of the first exemplary embodiment of the present invention.

FIG. 2 is a diagram illustrating an arrangement of the measurement execution unit 12 of FIG. 1. Referring to FIG. 2, the measurement execution unit 12 includes a measurement execution determination unit 121, a coverage problem detection unit 122, a measurement unit 123, and a measurement result holding unit (storage unit) 124. The measurement execution determination unit 121 receives an instruction from the measurement instruction acquisition unit 11, and instructs the measurement unit 123 to perform measurement periodically in accordance with a built-in timer not shown in the drawings. As a result of measurement by the measurement unit 123, in a case where the received quality of a serving cell then deteriorates to below a predetermined preset value, and a determination of a coverage hole detection is made by the coverage problem detection unit 122, as described below in several examples, the measurement execution determination unit 121 instructs the measurement unit 123 to perform a predetermined measurement operation (for example, measurement of a cell in which the radio terminal is not allowed to be served for receiving (performing) a predetermined service, for example, a normal service, in the neighborhood; acquisition of information on the cell; or the like) in response to detection of the coverage hole. The measurement unit 123 stores the measurement result or "OOS" information, neighborhood information or the like, in the measurement result holding unit 124. On going from an idle (in LTE, RRC_IDLE) mode to an active one (in LTE, RRC_CONNECTED), the measurement result reporting unit 13 notifies an (E-)UTRAN that a measurement result of a Logged MDT is available, and reports a log(measurement result) stored in the measurement result holding unit 123 in response to a log search (log retrieval) from the (E-)UTRAN.

Figure 3:
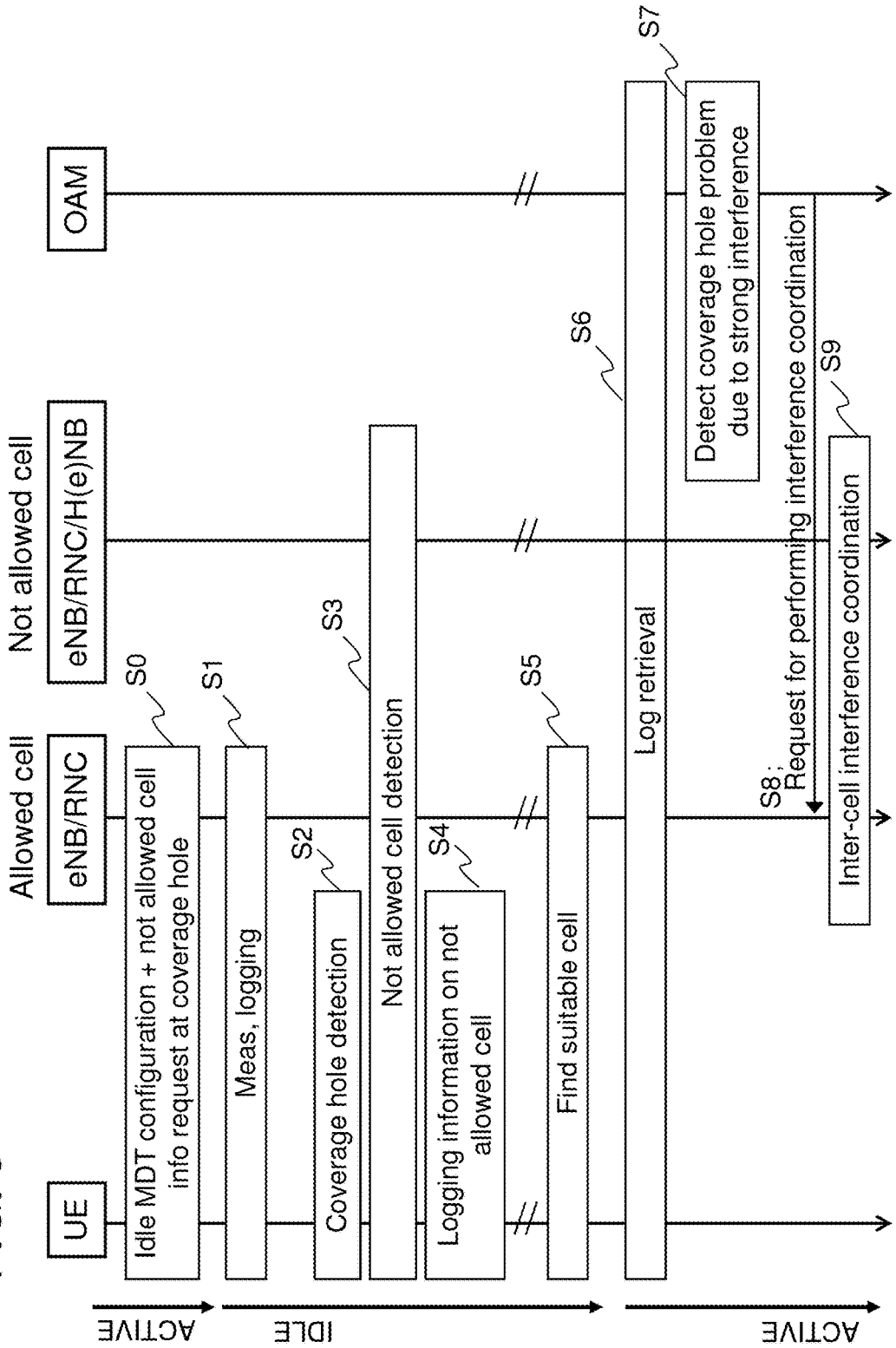
FIG. 3 is a diagram illustrating sequence operations of the system of the first exemplary embodiment of the present invention.

FIG. 3 is a diagram illustrating a procedure (sequence operations) of an overall system of the first exemplary embodiment of the present invention. In the present exemplary embodiment, "a radio terminal detects a situation in which selection of a first cell is not possible" is used as a "first condition" as described above. It is to be noted that "eNB/RNC" represents a network node eNodeB in E-UTRAN, or a network node NodeB+RNC in UTRAN. The radio terminal performs measurement and logging with an interval (period) indicated by eNB/RNC, during an idle mode, and similarly continues the measurement and logging during a time-period notified by eNB/RNC.

An eNB/RNC of a cell in which a radio terminal (UE) is allowed to be served for receiving (performing) a predetermined service, for example, a normal service (termed as "allowed cell"), instructs a radio terminal (UE) in an active mode to execute a Logged MDT in an idle mode (Idle MDT Configuration), and makes a request the radio terminal (UE) to acquire information on a cell in the neighborhood, by which the radio terminal is not allowed to be served for receiving a normal service (termed also as "not allowed cell") (not allowed cell information request), when the radio terminal detects a coverage hole (S0: Idle MDT configuration+not allowed cell info request at coverage hole). That is, the measurement instruction unit 21 of the base station 20 in FIG. 3 requests the radio terminal (UE) in a configuration message transmitted thereto to execute a Logged MDT and to acquire information on a not allowed cell, when a coverage hole is detected.

Here, the following examples may be cited as information included in a Logged MDT execution instruction (Idle MDT Configuration).

target of measurement and logging (Measurement object), event that triggers measurement and logging execution (Triggering of logging events) (indicate a period in case of periodic measurement and logging), valid time-period of measurement and logging (Total duration of logging), absolute time of logging on network side (Network absolute time stamp), and valid area of measurement and logging (Measurement area).

The radio terminal (UE) 10 in an active mode receives a request for execution of a Logged MDT and acquisition of information on a not allowed cell in a coverage hole from the measurement instruction acquisition unit 11.

On going to an idle mode, the measurement execution unit 12 of the radio terminal (UE) controls measurement and logging in accordance with an instruction given by the measurement instruction acquisition unit 11 (S1). For example, the measurement execution unit 12 instructs the measurement unit 123 to perform measurement, when measurement timing arrives, according to a timeout occurrence of a timer (not shown in the drawings) for measuring a preset time-period built in the measurement execution determination unit 121. Specifically, the measurement unit 123 measures, with a preset period, received quality of a downlink signal of a serving cell in which the radio terminal camps and in which the radio terminal is allowed to be served for receiving (performing) a predetermined service, for example, a normal service, and logs a measurement result, time (relative time stamp) and location information.

As to the location information logged together with the measurement result by the radio terminal (UE), in case of holding valid location information by a GNSS (Global Navigation Satellite System) such as GPS (Global Positioning System), the radio terminal (UE) logs the GNSS location information; otherwise, logs a measurement result (RSRP/CPICH RSCP+PCI/PSC) of a neighboring cell called an "RF fingerprint" instead of the GNSS location information. It is to be noted that measurement of a neighboring cell is an option, and is performed by the radio terminal (UE) as necessary. There is no need for the radio terminal (UE) to perform the measurement of a neighboring cell only for a Logged MDT. A neighboring cell that is a target for measurement is not only an allowed cell in which a radio terminal is allowed to be served for receiving (performing) a normal service, but may also include a cell for which it is not clear whether it is an allowed cell or not. On the other hand, measurement is not normally performed for a cell already recognized as a cell that the radio terminal (UE) is not allowed to be served for receiving (performing) a normal service.

Next, it is assumed that the radio terminal (UE) detects a coverage hole as a result of measurement of the received quality (S2: Coverage hole detection). A coverage hole corresponds to a situation (location), in which the received quality of all allowed cells is less than a preset threshold, and/or a situation (location) in which an allowed cell where broadcasted system information is able to be acquired cannot be detected. When the coverage problem detection unit 122 of the measurement execution unit 12 detects a coverage hole, the coverage problem detection unit 122 instructs the measurement unit 123 to determine whether or not a not allowed cell in which the radio terminal is not allowed to be served is present in the neighborhood. The measurement unit 123 instructs a cell detection unit 14 to detect a corresponding cell and makes a determination based on the detection result. It is to be noted that in determining whether or not a not allowed cell is present, a determination is made based on whether or not broadcasted system information of the corresponding cell can be acquired. On the other hand, in a case where the radio terminal (UE) already recognizes that the cell in question is a cell in which the radio terminal is not allowed to be served, the determination may be made based on whether or not received quality is greater than or equal to a preset value.

In a case of an example of FIG. 3, it is assumed that a not allowed cell in which the radio terminal is not allowed to be served is detected (S3: Not allowed cell detection). The not allowed cell, for example, may be a black listed cell managed by an eNB/RNC, or a CSG cell managed by an H(e)NB.

The radio terminal (UE) logs information on the not allowed cell (PCI/PSC, ECGI/CGI, CSG ID, or the like) (S4: Logging information on not allowed cell). It is to be noted that items described as the option 1 and option 2 above, such as a cell identifier (PCI/PSC, ECGI/CGI, CSG ID, etc.), received quality of the corresponding cell (RSRP/RSCP, RSRQ/Ec/No, etc.) and the like are used as not allowed cell information. Furthermore, at this time, the radio terminal (UE) may log "OOS" as information regarding the existence of a coverage hole. That is, in the measurement execution unit 12 of the radio terminal (UE), the measurement unit 123 stores information of a not allowed cell in the measurement result holding unit 124.

When the radio terminal (UE) in an idle mode gets out of a coverage hole, the cell detection unit 14 of the radio terminal (UE) detects a suitable cell, that is, an allowed cell (S5: Find suitable cell).

It is assumed that at a certain time, there occurs a trigger that causes the radio terminal (UE) to go into an active mode. At this time, in the radio terminal (UE), a radio link control unit of the control unit 15 establishes a radio link with a base station of an allowed cell (RRC Connection Setup). In a case where the radio terminal (UE) holds a log acquired in a Logged MDT, the radio terminal (UE) gives notification of holding the log(Log availability) to the eNB/RNC at a point in time (RRC Connection Setup Complete) when the radio terminal (UE) goes into an active mode. The eNB/RNC, responsive to this notification, retrieves the log (S6: Log retrieval). The radio terminal (UE) transmits the log held "measurement result+information of cell in which the radio terminal is not allowed to be served when a coverage hole is detected" to a base station of a serving cell. The measurement result acquisition unit 22 of the base station of the serving cell receives a report of the log held from the radio terminal (UE), and the measurement result reporting unit 23 transmits the reported log information to an OAM.

The measurement acquisition unit 31 of the OAM detects from the received log information that the coverage hole is due to strong interference from a cell in which the radio terminal is not allowed to be served (S7: Detect coverage hole problem due to strong interference).

The radio parameter configuration instruction unit 32 of the OAM requests an eNB/RNC, which is considered to mainly manage the coverage hole area, for example, to perform avoidance of interference among target cells (S8: Request for performing interference coordination).

In the eNB/RNC requested to perform the interference avoidance, the radio parameter configuration change unit 24 performs a solution for inter-cell interference avoidance (interference mitigation process) such as control of antenna tilt angle, transmission power or the like (S9: Inter-cell interference coordination). It is to be noted that in FIG. 3, both eNB/RNCs managing targeted cells may execute the solution for inter-cell interference avoidance, or only eNB/RNC that receives the request from the OAM may execute the solution.

Modified Example of First Exemplary Embodiment

Figure 4:
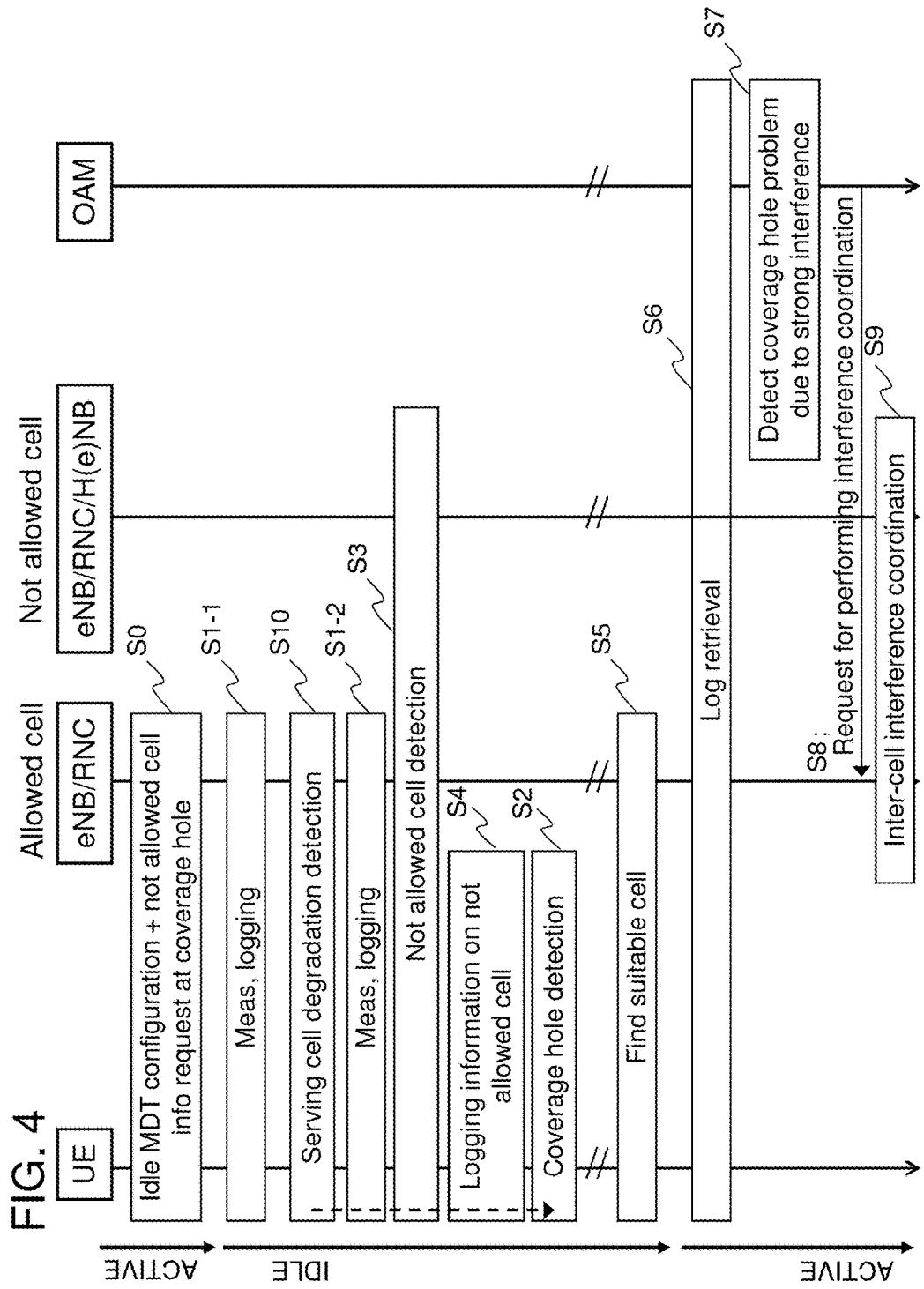
FIG. 4 is a diagram illustrating sequence operations of the system of a modified example of the first exemplary embodiment of the present invention.

FIG. 4 is a diagram illustrating another procedure of the overall system in a modified example of the first exemplary embodiment of the present invention. Here, as the "first condition", "received quality of a serving cell, to which a radio terminal is served, no longer satisfies a cell selection criteria" is used. What is different from the first exemplary embodiment in FIG. 3 is the point that, in FIG. 4, after coverage hole detection, information on a cell in which the radio terminal is not allowed to be served for receiving (performing) a predetermined service, for example a normal service, is logged. In the modified example of FIG. 4, after received quality of the serving cell does not satisfy a preset condition (cell selection criteria) as a cell that is suitable for camping (S10: Serving cell degradation detection), measurement and measurement result logging (S1-2 . . . ) are continued until a determination that a coverage hole is detected is made (S2: Coverage hole detection), and also a cell in which the radio terminal is not allowed to be served for receiving (performing) a predetermined service, for example a normal service, is detected (S3: Not allowed cell detection), and information of the not allowed cell is logged (S4: Logging information on not allowed cell). After logging the information on the cell in which the radio terminal is not allowed to be served (S4), measurement and logging are suspended until after the coverage hole is determined (S2), a suitable cell is again detected (S5: Find suitable cell). It is to be noted that procedures S8 to S9 are the same as in FIG. 3. Any well known method may be used for detection of a cell by the radio terminal (UE) in an idle mode.

Methods by which the radio terminal (UE) reports a measurement result include:

a method performed per measurement, a method performed at a period other than a measurement period, a method performed when instructed from a radio network, and the like.

In an event triggered measurement, the radio network notifies a radio terminal in advance of a condition that becomes a trigger for measurement, and the radio terminal performs measurement when the condition is satisfied. Trigger conditions may be, for example:

broadcast channel failure, paging channel failure, received quality of serving cell becomes worse than threshold, random access failure, radio link failure and the like (refer to Non Patent Literature 1, 6 UE measurements).

It is to be noted that a broadcast channel (BCH) and a paging channel (PCH) are common channels in which base stations transmit using a common radio resource to all radio terminals within a cell, and are used for broadcasting of control information and making calls. Methods for reporting a measurement result from a radio terminal according to an event trigger include:

a method performed per measurement, a method performed when instructed from the radio network.

The active mode indicates RRC_CONNECTED (Radio Resource Control Connected) in LTE, and CELL_DCH in UMTS. CELL_DCH is an RRC state where a dedicated physical channel is allocated to the radio terminal (UE) in uplink and downlink, and the radio terminal (UE) and base station are connected by individual channels to perform transmission and reception.

In Logged MDT, the following are include in contents measured by the radio terminal (UE) in an idle mode:

received quality of a downlink pilot signal in a serving cell, received quality of a downlink pilot signal in a neighboring cell, and the like.

That is, the radio terminal (UE) measures received quality of a downlink reference signal (pilot signal) from a base station of the abovementioned cell. It is to be noted that in LTE, RSRP (Reference Signal Received Power) or RSRQ (Reference Signal Received Quality) is used as received quality. On the other hand, in UMTS, CPICH RSCP (Common Pilot Channel Received Signal Code Power) or Ec/No (Ratio of energy per modulating bit to the noise spectral density) is used.

In Logged MDT, the following are included in contents reported by the radio terminal (UE) to the radio network side:

received quality of a downlink pilot signal in a serving cell, identifier of a serving cell (CGI/ECGI: Cell Global Identifier/E-UTRAN Cell Global Identifier), received quality of a downlink pilot signal in a neighboring cell, identifier of a neighboring cell (PSC/PCI: Primary Scrambling Code/Physical Cell Identifier), measurement time (relative time from absolute time when the radio terminal (UE) receives a measurement instruction), location information (valid GNSS (Global Navigation Satellite System) location information held at measurement time, or RF (Radio Frequency) fingerprint), and the like.

In a case where the measurement time at the radio terminal is within a predetermined preset time from the time of acquiring the GNSS location information at the radio terminal, the radio terminal determines that the GNSS location information is valid. In a case where the radio terminal (UE) does not hold valid GNSS location information, instead of the GNSS location information, as location information, a report is made of an RF fingerprint (PCI/PSC+RSRP/CPICH RSCP: physical cell identification information of a neighboring cell+received quality of a downlink pilot signal of a neighboring cell).

The physical cell identification information of a neighboring cell includes a physical cell identifier (PCI) of a neighboring cell acquired by the radio terminal (UE), or a primary scrambling code (PSC) for distinguishing each cell. The received quality of the downlink pilot signal of a neighboring cell is RSRP/CPICH RSCP.

Second Exemplary Embodiment

Figure 5:
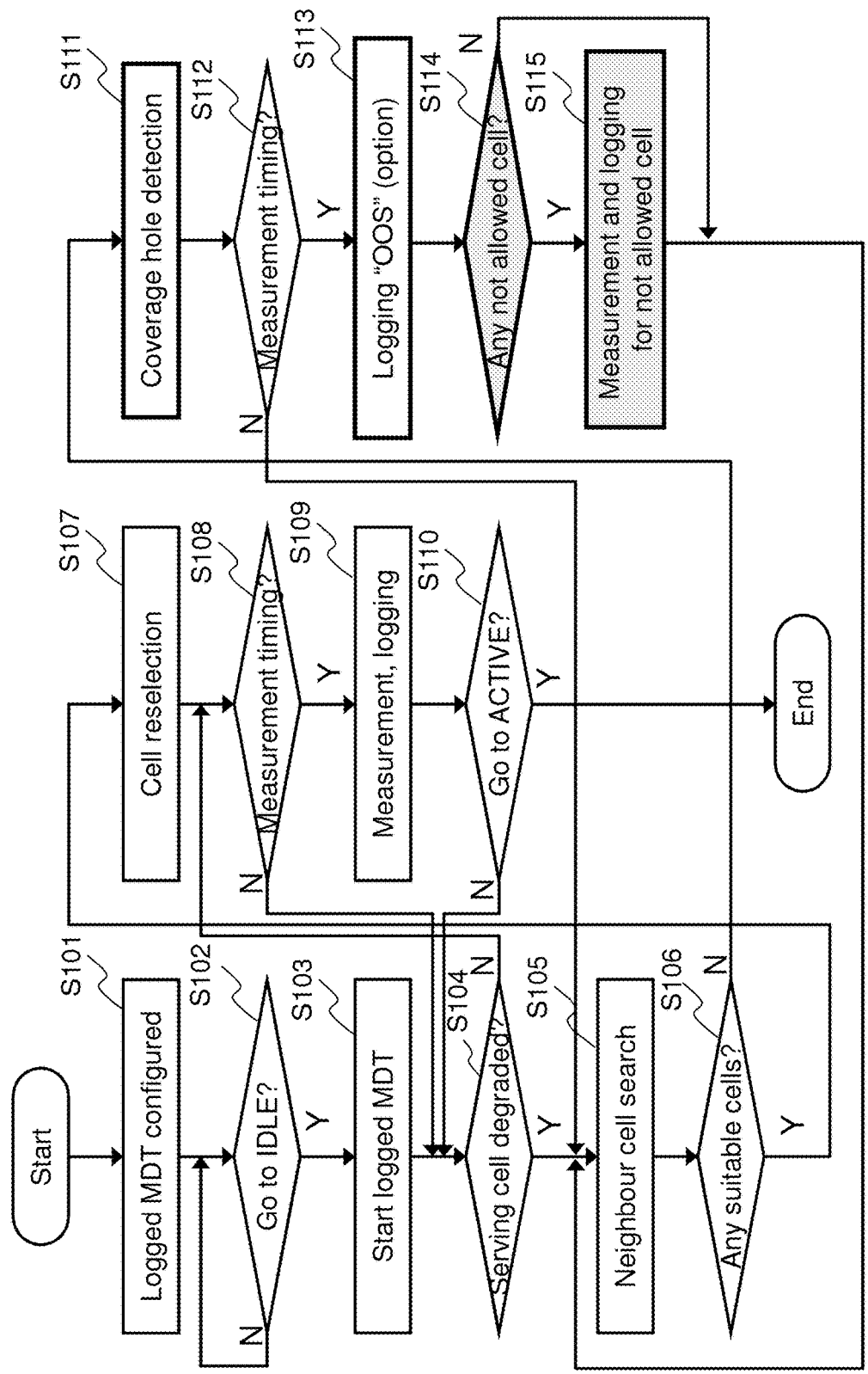
FIG. 5 is a flowchart describing operations of a radio terminal of a second exemplary embodiment of the present invention.

FIG. 5 is a flowchart describing operation of the Logged MDT measurement of a radio terminal (UE) of a second exemplary embodiment of the present invention. In the present exemplary embodiment, when a coverage hole is detected, in case of detecting a not allowed cell in which the radio terminal is not allowed to be served for receiving (performing) a predetermined service of a non-member CSG cell in the neighborhood, for example a normal service, the radio terminal (UE) measures received quality of the non-member CSG and performs logging.

The radio terminal (UE) in an active mode receives a configuration message of a Logged MDT from an eNB/RNC (Idle MDT Configuration), and performs configuration of the Logged MDT (step S101).

When the radio terminal (UE) goes into an idle mode (Y in step S102), a Logged MDT is started (step S103). The radio terminal (UE) measures received quality of a downlink pilot signal of a serving cell. Furthermore, the radio terminal (UE) measures received quality of a downlink pilot signal of a neighboring cell, as necessary.

As a result of measuring the received quality of the serving cell, in a case where the received quality of the serving cell becomes worse than a threshold (step S104, branch Y), the radio terminal (UE) performs a neighboring cell search as to whether or not there is a more suitable cell for camping, in the neighborhood (step S105).

As a result of the neighboring cell search, when a suitable cell is present (Y in step S106), a reselection of a serving cell (Cell reselection) is performed (step S107). Thereafter, at timing of measurement in the Logged MDT (Y in step S108), the radio terminal (UE) performs measurement of the serving cell and logs a measurement result (S109). At this time, measurement of a neighboring cell may be performed as necessary, and a measurement result may be logged. It is to be noted that along with the measurement result, timing information and location information are logged. In a case where valid GNSS location information is held, the GNSS location information is logged as location information, and in a case where the valid GNSS location information is not held, an RF fingerprint is logged.

Next, when the radio terminal (UE) goes from an idle mode to an active mode (Y in step S110), the radio terminal (UE) stops the Logged MDT measurement, and reports a log that the radio terminal (UE) holds, in accordance with an instruction from the radio network. On the other hand, in a case where the radio terminal (UE) continues the idle mode (N in step S110), control returns to step S104.

As a result of the neighboring cell search in step S105, in a case where the radio terminal (UE) cannot detect a suitable cell in a preset time-period (N in step S106), a coverage hole is detected (step S111). Here, as the preset time-period, a duration in which the radio terminal (UE) is in a "camped normally" state may be considered. However, there is no limitation to this, and an "Any cell selection" state or a "Camped on any cell" state is also possible.

Next, the radio terminal (UE) determines whether or not measurement timing has arrived (step S112); if not measurement timing (N in step S112), step moves to step S105, but if measurement timing (Y in step S112), "OOS" (outside of operation range) is logged, as an option (step S113). Then, the radio terminal (UE) tries to detect a cell in order to determine whether or not a not allowed cell is present in the neighborhood (S114).

If a not allowed cell is detected (Y in step S114), measurement and logging of the not allowed cell are performed (step 115). A neighboring cell search is then performed again to find whether there is a suitable cell in the neighborhood or not (step 105).

FIG. 6 is a diagram illustrating a sequence of the system in the second exemplary embodiment of the present invention. Referring to FIG. 6, an eNB/RNC of a macro cell requests to the radio terminal (UE) in an active mode, for a Logged MDT configuration in an idle mode (idle MDT configuration), and for measurement and logging of the CSG cell in question (CH measurement and logging configuration) in a case where when a coverage hole is detected, there is a non-member CSG cell in the neighborhood (S11: Idle MDT configuration+CH measurement & logging configuration). In a case where when a coverage hole (CH) is detected, there is a non-member CSG cell in the neighborhood of the radio terminal (UE), the abovementioned request instructs measurement and logging thereof.

When the radio terminal (UE) goes into an idle mode, the radio terminal (UE) periodically performs measurement and logging of a macro cell that is a serving cell, at preset timing (S12-1, S12-2 . . . ). The radio terminal (UE) may also perform measurement and logging as necessary for neighboring cells.

On detecting degradation in received quality of the serving cell, (S13: Serving cell degradation detection), the radio terminal (UE) tries to perform cell detection with regard to whether or not there is a more suitable cell in the neighborhood.

FIG. 6 illustrates a case where the radio terminal (UE) detects a CSG cell (non-member) (a base station is HeNB/HNB) (S14: CSG cell (non-member) detection). The radio terminal (UE) detects that the quality of the serving macro cell has degraded, and detects that there is a CSG cell with good quality in the neighborhood. However, since this is a cell in which the radio terminal (UE) is not allowed to be served, the radio terminal (UE) does not perform cell re-selection, and confirms whether or not there is another suitable cell.

Thereafter, the radio terminal (UE) detects a coverage hole (CH) (S15). At this time, the radio terminal (UE) may log "OOS" as information indicating that the coverage hole has been detected.

After detecting the coverage hole (CH), if a not allowed cell such as a non-member CSG cell is present in the neighborhood, the radio terminal (UE) performs measurement and logging of the not allowed cell in question (S16). There are determination methods such as: whether or not the not allowed cell is present, whether or not the received quality of the corresponding cell is greater than or equal to a preset value necessary for performing basic service, or whether or not system information broadcasted from the corresponding cell can be acquired.

Thereafter, the radio terminal (UE) detects a suitable cell (macro cell) (S17: Find suitable cell).

The radio terminal (UE) again performs measurement and logging of the macro cell in question at preset measurement timing (S18).

In a case where the radio terminal (UE) establishes a radio link with an eNB/RNC of the macro cell and goes into an active mode, the radio terminal (UE) notifies log availability to the eNB/RNC, and reports the log to the eNB/RNC, in accordance with an instruction by the eNB/RNC to retrieve the log(S19).

Figures 7A, 7B:
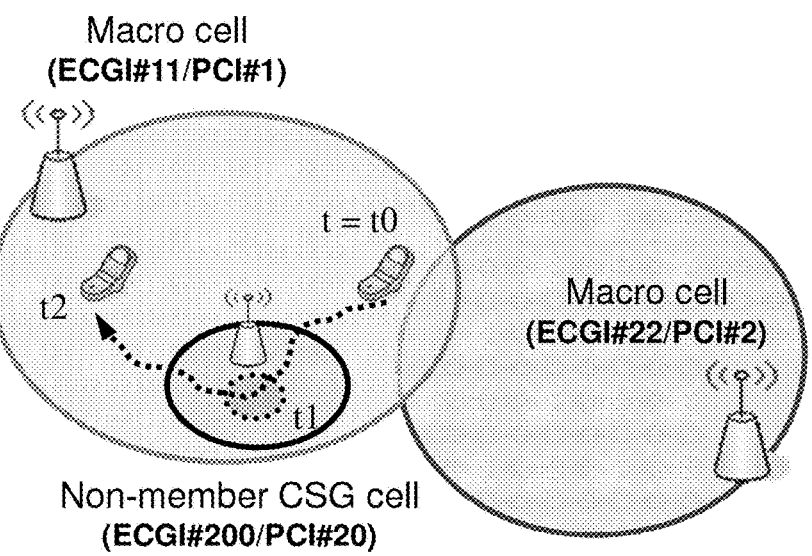
FIGS. 7A and 7B are diagrams illustrating an example of a log of the second exemplary embodiment of the present invention.

FIG. 7 is a diagram illustrating an example of a log of the second exemplary embodiment of the present invention. FIG. 7A illustrates an example of log information of a Logged MDT at respective measurement timing of FIG. 7B (note that LTE is assumed in the present example). The radio terminal (UE) periodically performs measurement and logging in an idle mode. It is to be noted that a cell of ECGI#200/PCI#20 is a non-member CSG cell for this radio terminal (UE), and is not allowed.

In the present exemplary embodiment, it is assumed that when the radio terminal (UE) detects a coverage hole and detects a non-member CSG cell in the neighborhood, the radio terminal (UE) logs RSRP of the non-member CSG cell and the ID of the cell.

As shown in FIG. 7B, the radio terminal (UE) that receives an instruction to periodically execute the Logged MDT, is in an idle mode and camps in the cell (ECGI#11/PCI#1).

At time t=t0, the radio terminal (UE) performs measurement and logging of a serving cell (ECGI#11) and a neighboring cell (PCI#2). It is assumed that the measurement includes RSRP/RSRQ for the serving cell (ECGI#11), and RSRP for the neighboring cell (PCI#2). However, RSRQ of the neighboring cell may also be measured (PCI#2).

At time t=t1, with the received quality of the serving cell degraded, the radio terminal (UE) cannot find an allowed cell in the neighborhood, detects a coverage hole, and logs "OOS". It is to be noted that "OOS" may be treated as an option and need not necessarily be logged. The radio terminal (UE) logs a measurement result of RSRP for the non-member CSG cell (ECGI#200/PCI#20) that the radio terminal (UE) detects in the neighborhood.

The radio terminal (UE) that gets out of the coverage hole performs measurement and logging of the serving cell (ECGI#11) and the neighboring cell (PCI#2), at timing t=t2.

According to the present exemplary embodiment, from a measurement result logged by the radio terminal (UE) when the coverage hole is detected, it is possible to determine that the coverage hole in question is due to interference of a non-member CSG cell.

In the present exemplary embodiment, a radio terminal (UE) that detects a coverage hole, logs "OOS", in a case where in the neighborhood, a suitable cell (allowed cell) is not present, and a not allowed cell is not present.

It is to be noted that logging of "OOS" is not mandatory.

On the other hand, a radio terminal (UE) that detects a coverage hole, logs "OOS" and information on a not allowed cell detected in a case where, in the neighborhood:

a suitable cell (allowed macro cell) is not present, and a not allowed cell is present.

Regarding the information on the not allowed cell, a measurement result (RSRP/RSCP), PCI/PSC, or the like may be adopted. It is to be noted that logging of "OOS" is not mandatory.

First Modified Example of Second Exemplary Embodiment

Figure 8:
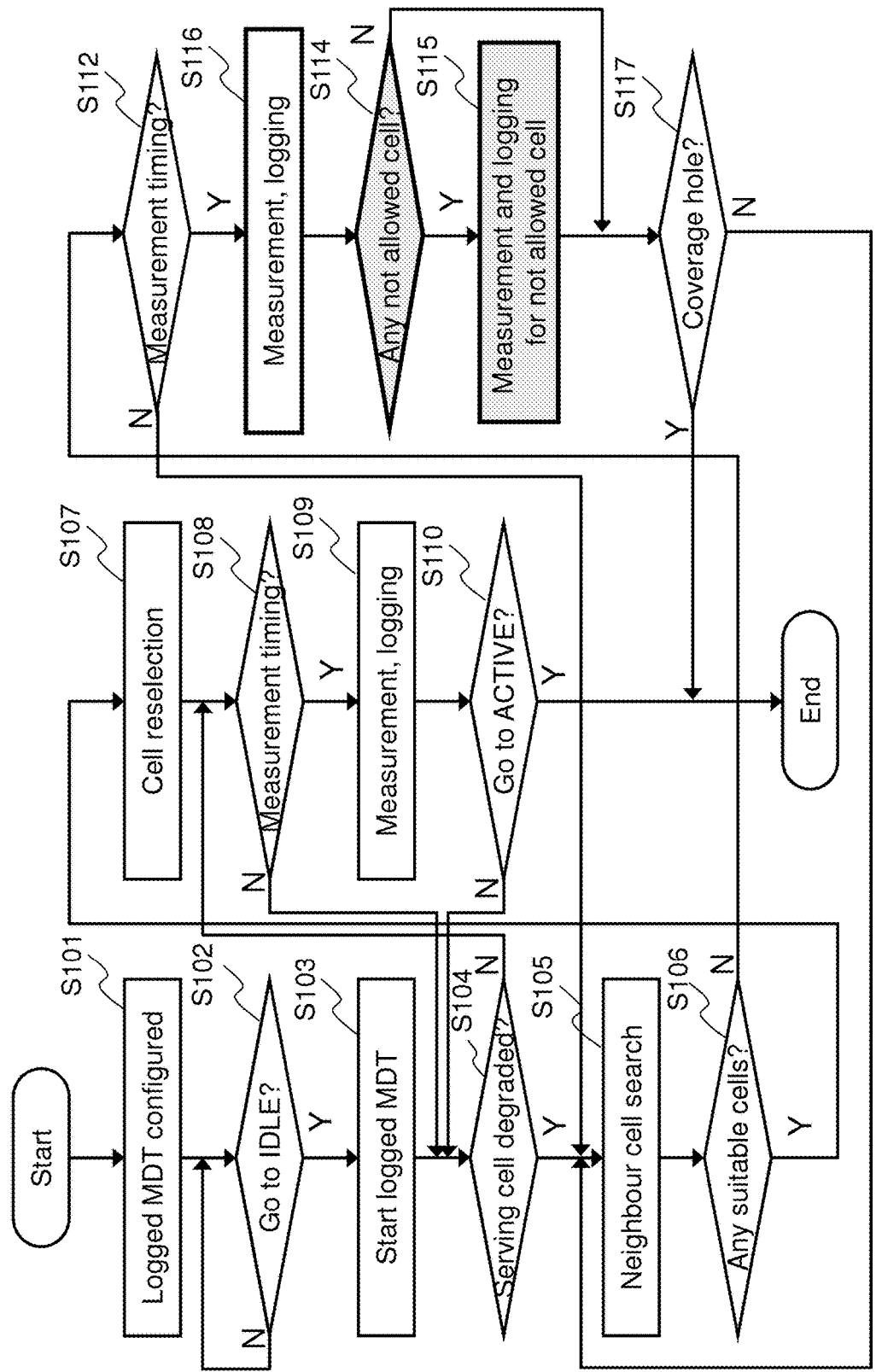
FIG. 8 is a flowchart describing operations of a radio terminal of a first modified example of the second exemplary embodiment of the present invention.
Figure 9:
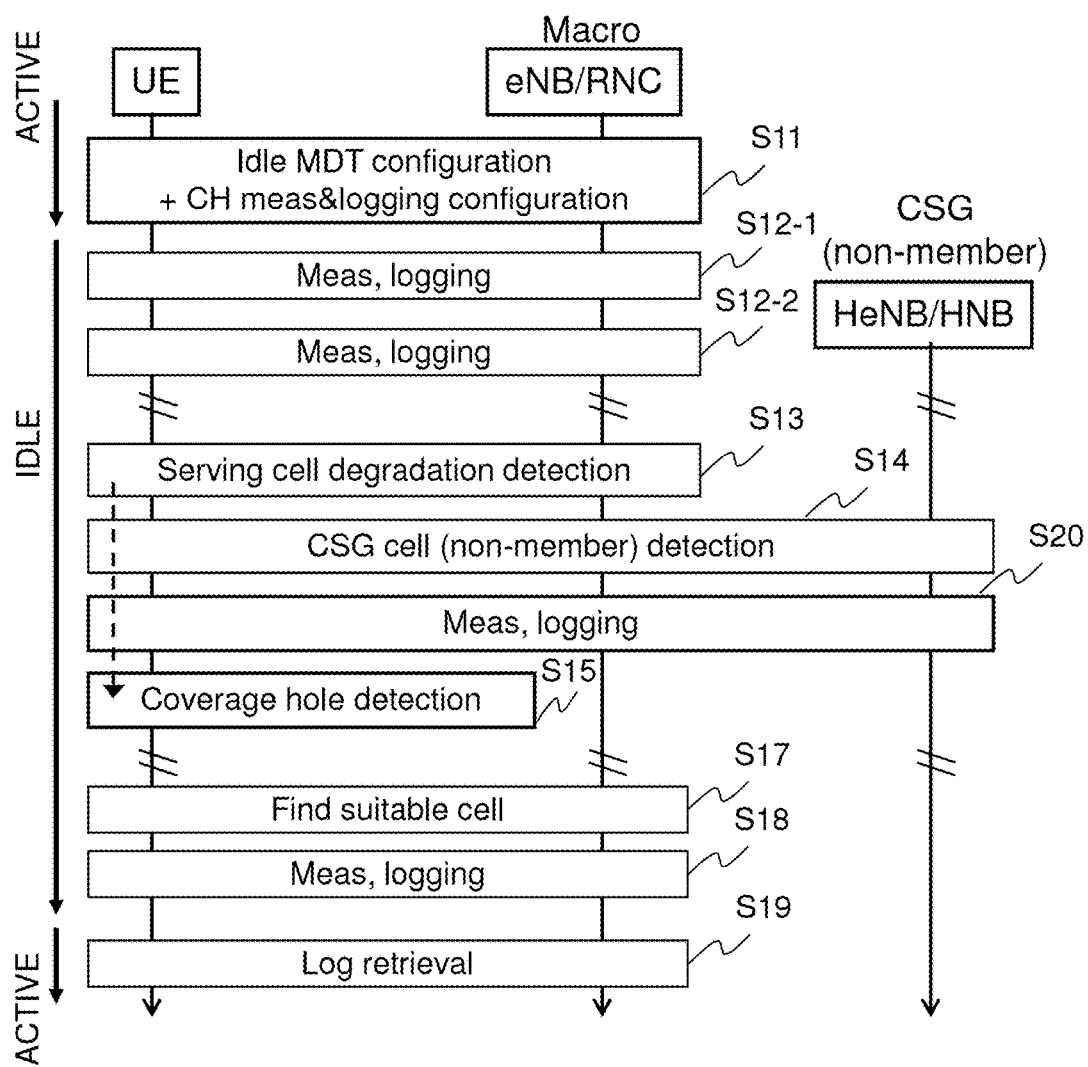
FIG. 9 is a diagram illustrating sequence operations of the system of the first modified example of the second exemplary embodiment of the present invention.

FIG. 8 is a flowchart illustrating operations of Logged MDT measurement by a radio terminal (UE) of a first modified example of the second exemplary embodiment of the present invention. FIG. 9 is a diagram illustrating a sequence of a system of the first modified example of the second exemplary embodiment of the present invention. What is different from the second exemplary embodiment described with reference to FIG. 5 and FIG. 6 is as follows: In FIG. 5 and FIG. 6, after detecting a coverage hole, the radio terminal (UE) performs measurement and logging for a not allowed cell in which the radio terminal (UE) is not allowed to be served for receiving (performing) a predetermined service, for example a normal service (step S115 in FIG. 5, S16 in FIG. 6). In the first modified example of FIG. 8 and FIG. 9, after detecting that a preset condition (cell selection criteria) for a cell, which is suitable for camping with regard to received quality of a serving cell, is no longer satisfied, the radio terminal (UE) continues measurement and measurement result logging for an (old) serving cell or neighboring cell until a coverage hole is determined (time-period of broken-line arrow from S13 to S15 in FIG. 9) (step S116 in FIG. 8), and if a not allowed cell is detected (Y in step S114 of FIG. 8, S14: CSG (non-member) detection, in FIG. 9), the radio terminal (UE) performs measurement and logging of measurement results for the not allowed cell (CSG cell (non-member) in FIG. 9) (step S115 in FIG. 8, S20 in FIG. 9). After detecting a coverage hole (Y in step S117 of FIG. 8, S15 of FIG. 9), the radio terminal (UE) suspends measurement and logging until the radio terminal (UE) detects a suitable cell again (Y in step S106 of FIG. 8, S17 of FIG. 9).

Second Modified Example of Second Exemplary Embodiment

Figure 10:
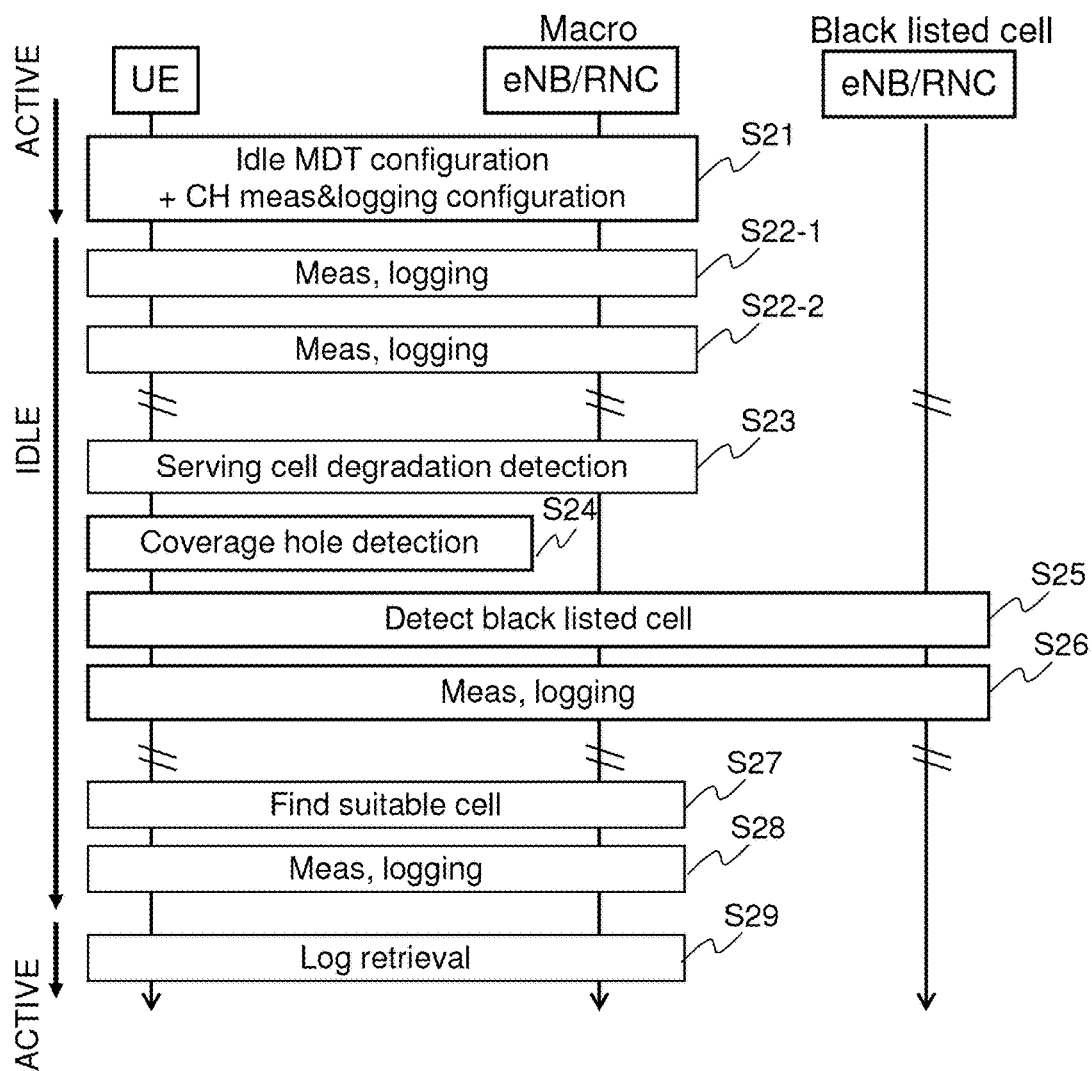
FIG. 10 is a diagram illustrating sequence operations of the system of a second modified example of the second exemplary embodiment of the present invention.

FIG. 10 is a diagram illustrating sequence operations of a second modified example of the second exemplary embodiment of the present invention. A difference from the second exemplary embodiment of FIG. 7 is that a not allowed cell in the neighborhood is not a non-member CSG cell, but is a black listed cell.

Referring to FIG. 10, an eNB/RNC makes a request to a radio terminal (UE) in an active mode for configuration of a Logged MDT in an idle mode (idle MDT configuration), and when a coverage hole (CH) is detected, in a case where there is a black listed cell in the neighborhood, the eNB/RNC makes a request to the radio terminal (UE) for measurement and logging thereof (CH measurement and logging configuration) (S21: Idle MDT configuration+CH measurement & logging configuration).

When the radio terminal (UE) goes into an idle mode, the radio terminal (UE) periodically performs measurement and logging at preset timing (S22-1, S22-2 . . . ).

It is assumed that at a certain point in time, the radio terminal (UE) detects degradation in received quality of a serving cell, (S23: Serving cell degradation detection).

In a case where the radio terminal (UE) cannot detect an allowed cell in the neighborhood in a preset time-period, the radio terminal (UE) detects a coverage hole (CH) (S24: coverage hole detection). At this time, the radio terminal (UE) may log "OOS".

The radio terminal (UE), after detecting coverage hole, tries to detect whether there is a black listed cell in the neighborhood. In the present exemplary embodiment, it is assumed that a black listed cell is detected (S25: Detect black listed cell).

When the radio terminal (UE) detects the coverage hole, if there is a black listed cell in the neighborhood, the radio terminal (UE) performs measurement and logging of the black listed cell (S26).

Thereafter, the radio terminal (UE) detects a suitable cell (for example, a macro cell) (S27: Find suitable cell).

The radio terminal (UE) performs measurement and logging for the suitable cell, that is, a serving cell, and a neighboring cell (S28).

The radio terminal (UE) establishes a radio link with an eNB/RNC of a serving macro cell, goes into an active mode, and reports a measurement result to the eNB/RNC (log retrieval) (S29).

According to the present exemplary embodiment, when a coverage hole is detected by the radio terminal (UE), the OAM can determine if the coverage hole in question is due to interference of the black listed cell, or due to a black list setting defect (the corresponding cell should be removed from the black list), or if there is a macro cell coverage problem.

Third Exemplary Embodiment

Figure 11:
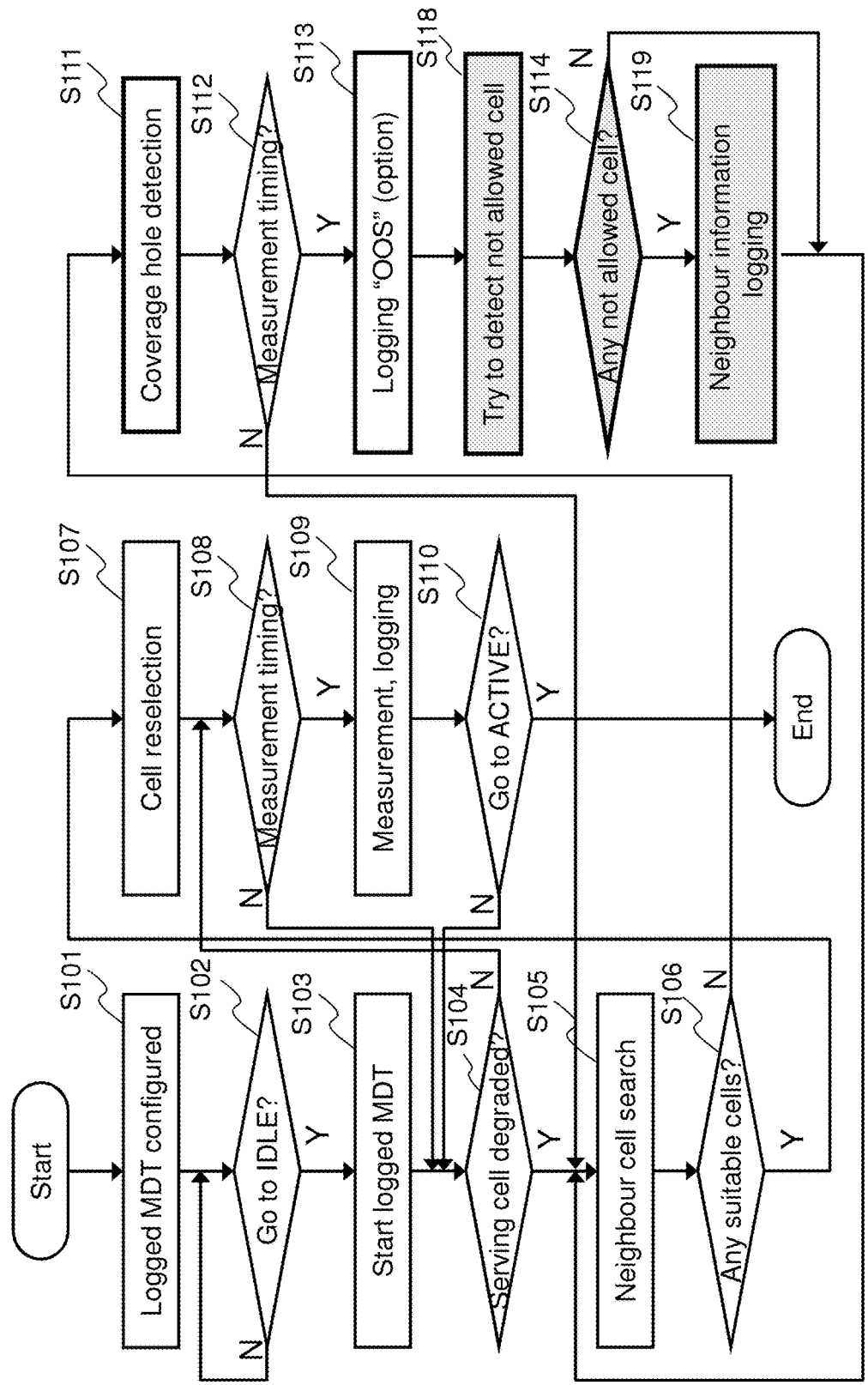
FIG. 11 is a flowchart describing operations of a radio terminal of a third exemplary embodiment of the present invention.

FIG. 11 is a flowchart describing operation of Logged MDT measurement of a radio terminal (UE) in a system of a third exemplary embodiment of the present invention. In the present exemplary embodiment, in a case wherein when detecting a coverage hole, the radio terminal detects a not allowed cell in which the radio terminal is not allowed to be served for receiving (performing) a predetermined service, for example, a normal service, such as a non-member CSG cell in the neighborhood, the radio terminal (UE) performs logging of neighbor information on the not allowed cell. The neighbor information on the not allowed cell not only includes information on the not allowed cell, but also may include information on an allowed cell in which a radio terminal is allowed to be served for receiving (performing) a predetermined service, for example, a normal service.

Referring to FIG. 11, the radio terminal (UE) in an active mode receives a Logged MDT configuration message (Idle MDT Configuration) from an eNB/RNC, and performs configuration of the Logged MDT (step S101).

When the radio terminal (UE) goes from an active mode to an idle mode (Y in step S102), the radio terminal (UE) starts the Logged MDT (step S103).

When the received quality of a serving cell degrades (Y branch in step S104), the radio terminal (UE) performs a neighboring cell search (step S105).

As a result of the neighboring cell search, in a case where a more suitable cell is present (Y in step S206), the radio terminal (UE) performs reselection of a serving cell (step S107). At timing of measuring the Logged MDT in idle mode (Y in step S108), the radio terminal (UE) performs measurement of the serving cell and logs measurement data (S109). At this time, the radio terminal (UE) may perform measurement of a neighboring cell as necessary, and may log a measurement result. It is to be noted that along with the measurement result, the radio terminal (UE) logs timing information and location information. In a case where the radio terminal (UE) holds valid GNSS location information, as location information, the radio terminal (UE) logs the GNSS location information, and in a case where the radio terminal (UE) does not hold valid GNSS location information, the radio terminal (UE) logs an RF fingerprint.

The radio terminal (UE) establishes a radio link with an eNB/RNC of a macro cell. When the radio terminal (UE) goes from an idle mode to an active mode (Y in step S110), the radio terminal (UE) stops the Logged MDT measurement. If the radio terminal (UE) continues to be in the idle mode (N in step S110), control returns to step S104.

As a result of the neighboring cell search (step S105), if the radio terminal (UE) cannot detect a suitable cell in a preset time-period (N in step S106), a coverage hole is detected (step S111). If the time is not measurement timing (N in step S112), control moves to step S105. On the other hand, if the time is measurement timing (Y in step S112), the radio terminal (UE) logs "OOS" (outside of operation range) (step S113). Here, the logging of "OOS" is not mandatory, and "OOS" need not be logged.

The radio terminal (UE) tries to detect a not allowed cell (step S118: try to detect a not allowed cell). As a result of step S118, in a case where the radio terminal (UE) detect the not allowed cell (Y in step S114), the radio terminal (UE) performs logging of neighbor information on the not allowed cell (step S119).

The following may be cited, for example, as the neighbor information on the not allowed cell logged in step S119 of FIG. 11.

(A) Presence or absence of a not allowed cell
Where a not allowed cell is present, information of the cell (PCI/PSC, and/or ECGI/CGI, etc.) is included.
(B) Presence or absence of a cell in which received strength (RSRP/RSCP) of a downlink pilot signal is greater than or equal to a predetermined preset value, but it is not possible to acquire broadcast information. In a case where the corresponding cell is present, information of the cell (RSRP/RSCP, PCI/PSC, ECGI/CGI, or the like) is included.
(C) Information as to whether or not a cell for which the received quality (RSRQ/Ec/No) of a downlink pilot signal is maximum (highest), is an allowed cell (or corresponding to an immediately preceding serving cell or a neighboring cell of a neighboring cell list (NCL)). Or, conversely, information as to whether or not a cell for which the received quality (RSRQ/Ec/No) of a downlink pilot signal is maximum, is a not allowed cell.

Figure 12:
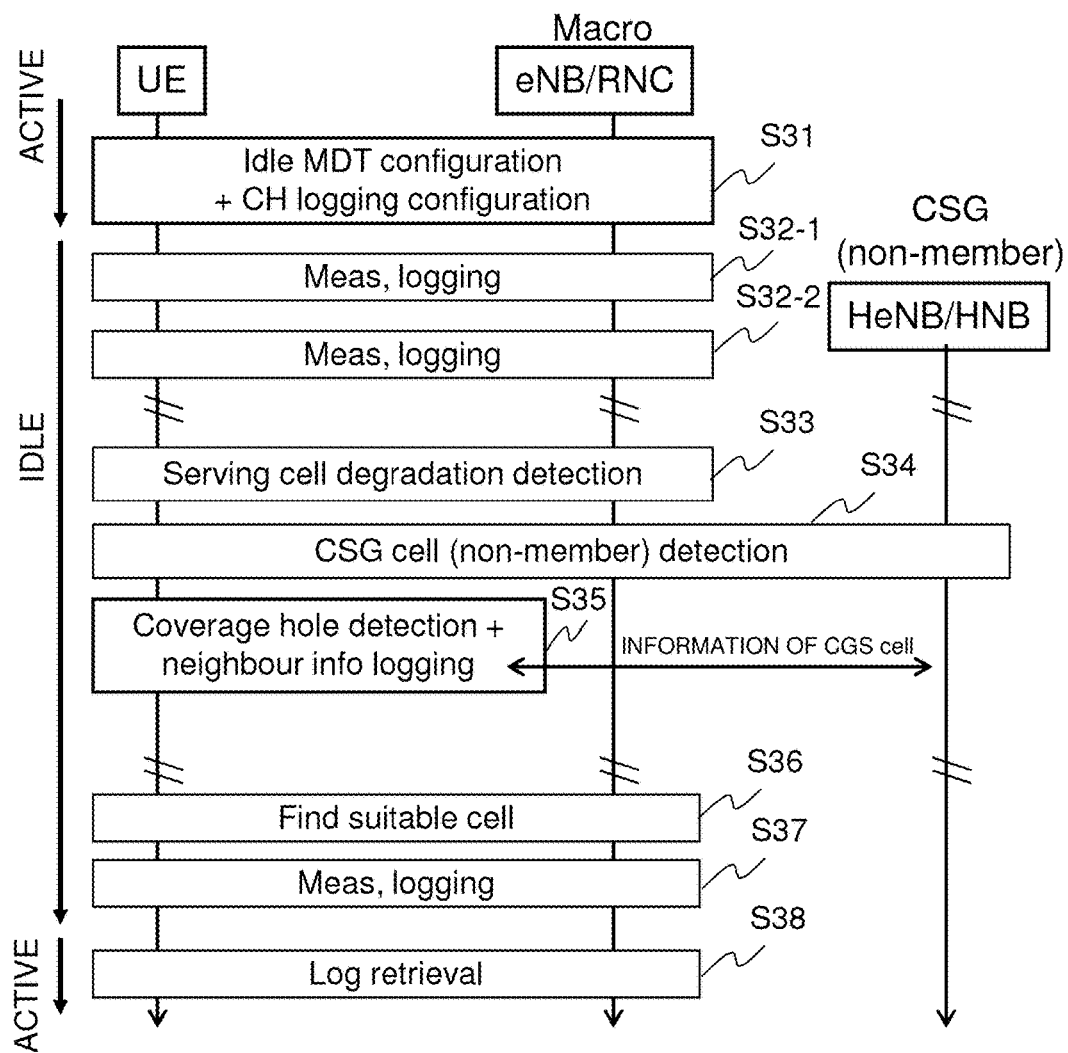
FIG. 12 is a diagram illustrating sequence operations of a system of the third exemplary embodiment of the present invention.

FIG. 12 is a diagram illustrating a sequence of the system in the third exemplary embodiment of the present invention.

Referring to FIG. 12, an eNB/RNC of a macro cell makes a request to the radio terminal (UE) in an active mode, for Logged MDT configuration in an idle mode (Idle MDT configuration), and for logging of neighbor information on a not allowed cell (CH logging configuration), when a coverage hole (CH) is detected (S31: Idle MDT configuration+CH logging configuration).

When the radio terminal (UE) goes into an idle mode, the radio terminal (UE) periodically performs measurement and logging of a macro cell that is a serving cell at preset timing (S32-1, S32-2 . . . ).

On detecting degradation in received quality of the serving cell (S33: Serving cell degradation detection), the radio terminal (UE) confirms whether or not there is a more suitable (that is, better received quality) cell in the neighborhood. As a result, if a not allowed cell such as a non-member CSG cell or the like is detected, (S34: CSG cell (non-member) detection), the radio terminal (UE) does not perform cell reselection to the not allowed cell.

In a case of detecting a coverage hole (CH), the radio terminal (UE) logs neighbor information (S35: Coverage hole detection+neighbor info logging). At this time, the radio terminal (UE) may log "OOS". As the neighbor information, for example, after detection of the coverage hole (CH), if there is a not allowed cell in the neighborhood (for example, a non-member CSG cell) or the like, the radio terminal (UE) may log information: "not allowed cell present".

Thereafter, the radio terminal (UE) gets out of a coverage hole and detects a suitable cell (macro cell) (S36: Find suitable cell).

The radio terminal (UE) again performs measurement and logging of the macro cell that is a serving cell, at preset measurement timing (S37).

The radio terminal (UE) establishes a radio link with an eNB/RNC of the macro cell and goes into an active mode, notifies log availability to the eNB/RNC, and reports the log to the eNB/RNC, in accordance with an instruction for log retrieval received from the eNB/RNC (S38).

According to the present exemplary embodiment, when the radio terminal (UE) detects a coverage hole, the OAM can recognize the environment of the neighborhood of the coverage hole, and in particular the presence or absence of a not allowed cell. This information may be utilized in a following way: When it is reported that a not allowed cell is present, for example, a determination may be made that interference of the not allowed cell is a cause therefor, and an instruction may be given to the eNB/RNC to apply technology for interference avoidance (reduction).

Figures 13A, 13B:
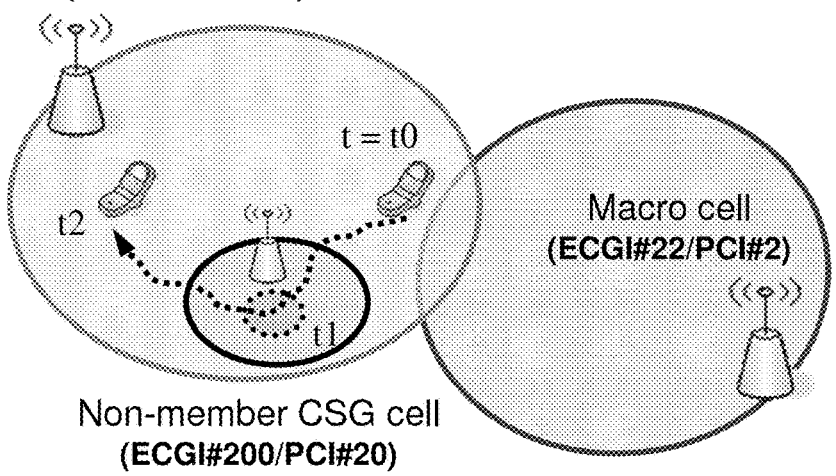
FIGS. 13A and 13B are diagrams illustrating an example of a log of the third exemplary embodiment of the present invention.

FIG. 13 is a diagram illustrating an example of a log of the third exemplary embodiment of the present invention. FIG. 13A shows an example of log information of a Logged MDT at respective measurement timing of FIG. 13B (note that LTE is assumed in the present example). The radio terminal (UE) periodically performs measurement and logging in an idle mode. It is to be noted that a cell of ECGI#200/PCI#20 is a non-member CSG cell for this radio terminal (UE), and is not allowed.

In FIG. 13 B3, the radio terminal (UE) that receives an instruction to periodically execute the Logged MDT is in an idle mode and camps in the cell (ECGI#11/PCI#1).

At time t=t0, the radio terminal (UE) performs measurement and logging of a serving cell (ECGI#11/PCI#1) and a neighboring cell (PCI#2). The measurement result assumes RSRP/RSRQ for the serving cell (ECGI#11), and RSRP for the neighboring cell (PCI#2). However, the radio terminal (UE) may perform measurement of RSRQ of the neighboring cell (PCI#2).

At time t=t1, with the received quality of the serving cell degraded, the radio terminal (UE) cannot find an allowed cell in the neighborhood, detects a coverage hole, and logs "OOS". It is to be noted that "OOS" may be treated as an option, and need not necessarily be logged. At this time, the radio terminal (UE) logs neighbor information on a not allowed cell. As the logged neighbor information, the following may be cited, for example:

presence of absence of a not allowed cell in the neighborhood (if present, the ID of a non-member CSG cell (PCI#20 and/or ECGI#200) is logged), presence or absence of a cell for which received strength (RSRP/RSCP) of a downlink pilot signal is greater than or equal to a predetermined preset value, but it is not possible to acquire broadcast information, information as to whether or not a cell for which the received quality (RSRQ/Ec/No) of a downlink pilot signal is maximum (highest), is an allowed cell (or corresponds to an immediately preceding serving cell or a neighboring cell in a neighboring cell list (NCL)) (or, conversely, information as to whether or not a cell for which the received quality (RSRQ/Ec/No) of a downlink pilot signal is maximum, is a not allowed cell).

The radio terminal (UE) moves from the coverage hole, and at time t=t2, the radio terminal (UE) performs measurement and logging of the serving cell (ECGI#11) and the neighboring cell (PCI#2).

According to the present exemplary embodiment, when the radio terminal (UE) detects a coverage hole, the OAM can comprehend neighbor information of the coverage hole (the presence or absence of a not allowed cell), and, based on the neighbor information, determines whether to perform coverage optimization or to apply technology for avoiding (reducing) interference for a macro cell and CSG cell, and performs execution thereof.

First Modified Example of Third Exemplary Embodiment

In the third exemplary embodiment described with reference to FIG. 11 and FIG. 12, after coverage hole detection, information on a not allowed cell in which a radio terminal is not allowed to be served for receiving (performing) a predetermined service, for example, a normal service, is logged. In the first modified example of the third exemplary embodiment, after detecting that a preset condition (cell selection criteria) for a cell, which is suitable for staying (camping) with regard to received quality of a serving cell, is no longer satisfied, measurement and measurement result logging for an (old) serving cell or neighboring cell are continued for a time-period until a coverage hole is identified, and also logging is performed for neighbor information on the not allowed cell in which the radio terminal is not allowed to be served.

That is, in the first modified example, logging of measurement and measurement results of a serving cell or a neighboring cell, and logging of neighbor information (for example, CSG cell information of FIG. 12) related to a not allowed cell are inserted between S33 (serving cell degradation detection) of FIG. 12 and coverage hole detection of S35. It is to be noted that in the first modified example, "coverage hole detection+neighbor information logging" of S35 of FIG. 12 forms coverage hole detection. In the first modified example, after determining a coverage hole (after S35 in FIG. 12), measurement or logging are suspended until a suitable cell is again detected.

Second Modified Example of Third Exemplary Embodiment

Figure 14:
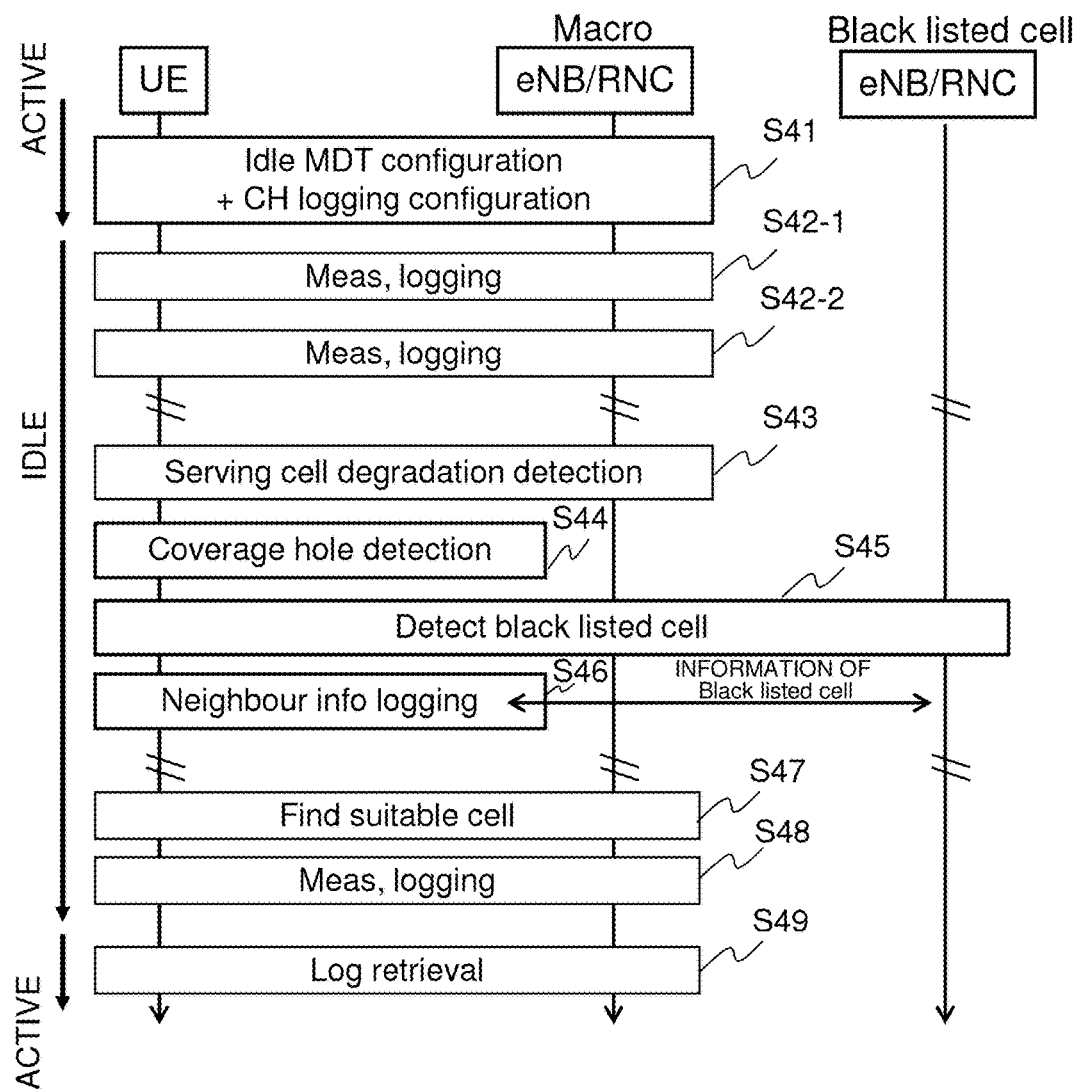
FIG. 14 is a diagram illustrating sequence operations of the system of a second modified example of the third exemplary embodiment of the present invention.

FIG. 14 is a diagram illustrating sequence operations of the system of a second modified example of the third exemplary embodiment of the present invention. A point of difference from the third exemplary embodiment described with reference to FIG. 12 is that a not allowed cell in the neighborhood is not a non-member CSG cell, but is a black listed cell.

Referring to FIG. 14, an eNB/RNC makes a request to a radio terminal (UE) in an active mode, using a configuration message, for configuration of a Logged MDT in an idle mode (idle MDT configuration), and in case where when a coverage hole (CH) is detected, a black listed cell is present in the neighborhood, for logging of neighbor information on a not allowed cell such as the black listed cell in question (S41: Idle MDT configuration+CH logging configuration).

When the radio terminal (UE) goes into an idle mode, the radio terminal (UE) performs measurement and logging at preset timing (S42-1, S42-2 . . . ).

It is assumed that at a certain point in time, the radio terminal (UE) detects degradation in the received quality of a serving cell (S43: Serving cell degradation detection).

In a case where the radio terminal (UE) cannot detect an allowed cell (suitable cell) in the neighborhood in a preset time-period, the radio terminal (UE) detects a coverage hole (CH) (S44: Coverage hole detection). At this time, the radio terminal (UE) may log "OOS".

The radio terminal (UE) detects whether there is a black listed cell in the neighborhood (S45: Detect black listed cell).

The radio terminal (UE) acquires information of the black listed cell and logs the information as neighbor information (S46).

The radio terminal (UE) moves from the coverage hole, and a cell detection unit 14 detects a suitable cell (macro cell) (S47: Find suitable cell).

The radio terminal (UE) again performs measurement and logging of the macro cell that is a serving cell (S48).

The radio terminal (UE) establishes a radio link with an eNB/RNC of the macro cell, goes into an active mode, and reports a log that the radio terminal (UE) holds to the eNB/RNC (S49: Log retrieval).

According to the present exemplary embodiment, when the radio terminal (UE) detects a coverage hole, the OAM can recognize the presence or absence of a black list cell and information thereof. In this way, it is possible to determine whether if the coverage hole in question is due to interference of the black listed cell, or due to a defect in black list setting (the corresponding cell should be removed from the black list), or there is a macro cell coverage problem.

Fourth Exemplary Embodiment

The following describes a fourth exemplary embodiment of the present invention. In 3GPP, consideration is given to making a radio terminal (UE) perform measurement and logging for a Logged MDT only in case of being camped in a preset area. Here, the preset area, for example, may include:

Registered Public Land Mobile Network (RPLMN), wherein a location of a radio terminal (UE) is registered, a cell (list of 32 global cell IDs (logging of measurement is performed only when a UE camps in these cells)), TA or LA or RA (logging of measurement is performed only when a UE camps in a cell belonging to a TA/LA/RA) and the like (Non Patent Literature 4); where TA (Tracking Area) is an area that is a unit of management of the location of a radio terminal (UE) in an idle mode in LTE;

LA (Location Area) is an area (paging area) that is a unit for location registration of a radio terminal (Circuit Switched (CS) domain) in UMTS; and RA (Routing Area) is an area that is a unit for location registration of a radio terminal (Packet Switched (PS) domain) in UMTS.

When the radio terminal (UE) detects a coverage hole, the radio terminal (UE) is in a situation where the radio terminal (UE) does not clearly know where (in which area) the radio terminal (UE) camps. Accordingly, in a case where measurement and logging in Logged MDT are limited to a preset area, when the radio terminal (UE) detects the coverage hole, since the camping location of its station is unknown, the radio terminal (UE) cannot determine as to whether the location is in a specified preset area.

For example, in a case where, when the radio terminal (UE) detects a coverage hole, the radio terminal (UE) is instructed to perform measurement and logging of the measurement result, or to log "OOS (Out Of Service)", the radio terminal (UE) actually does not perform measurement and logging of the measurement result, and/or does not log "OOS". Or, for the radio terminal (UE), it is unclear as to under what condition measurement and logging of the measurement result and/or logging of "OOS" may be done.

This problem depends on when (at what point in time) the radio terminal (UE) recognizes a coverage hole. For example, assuming that in a case where it is not possible for the radio terminal (UE) to select an allowed cell (broadcasted system information cannot be acquired, or received quality is less than a preset value) in which the radio terminal (UE) is allowed to be served for receiving (performing) a predetermined service, for example a normal service, in a preset time-period, the coverage hole is recognized, in the relevant preset time-period the area in which the radio terminal (UE) is already camped is unclear, and operation of the radio terminal (UE) in the relevant preset time-period is an object to which the present invention applies. Here, the preset time-period described above, may include, for example:

while the radio terminal (UE) is in a "Camped normally" state, while the radio terminal (UE) is in an "Any cell selection" state, while the radio terminal (UE) is in a "Camped on any cell" state, and the like.

Accordingly, in the present exemplary embodiment, in case of detecting a coverage hole, a condition for measurement and logging of measurement results and/or logging "OOS" is any of the following.

(I) In a case where an area (PLMN, Cell/TA/LA/RA) just before the coverage hole is detected, is an area that is a target for a Logged MDT, as long as the area in which the radio terminal (UE) camps is not updated, the Logged MDT is regarded as being valid, and measurement and logging of the measurement result are performed and/or "OOS" is logged. In the present exemplary embodiment, after detecting a coverage hole, measurement and logging of the measurement result and/or logging of "OOS" are performed until a preset time elapses. Or, a preset number of times of measurements and logging of the measurement results, and/or logging of "OOS" is performed.

(II) In a case where when the radio terminal (UE) detects a coverage hole, there is available GNSS information, the radio terminal (UE) performs measurement and logging of the measurement result and/or logging of "OOS".

(III) In a case where when the radio terminal (UE) detects a coverage hole, a cell where measured RSRP/RSCP is the highest belongs to an area (ECGI/CGI) that is a target for Logged MDT, the radio terminal (UE) performs measurement and logging of the measurement result and/or logging of "OOS". At this time, a determination is made as to whether or not the cell is a target area for Logged MDT, according to whether or not there is a PCI/PSC logged in the past, or whether or not, by holding an relationship between ECGI/CGI and PCI/PSC, based on this relationship, a PCI/PSC of a cell with the highest RSRP/RSCP is included in the target area. It is to be noted that instead of RSRP/RSCP, RSRQ/Ec/No or the like may be used.

Figure 15:
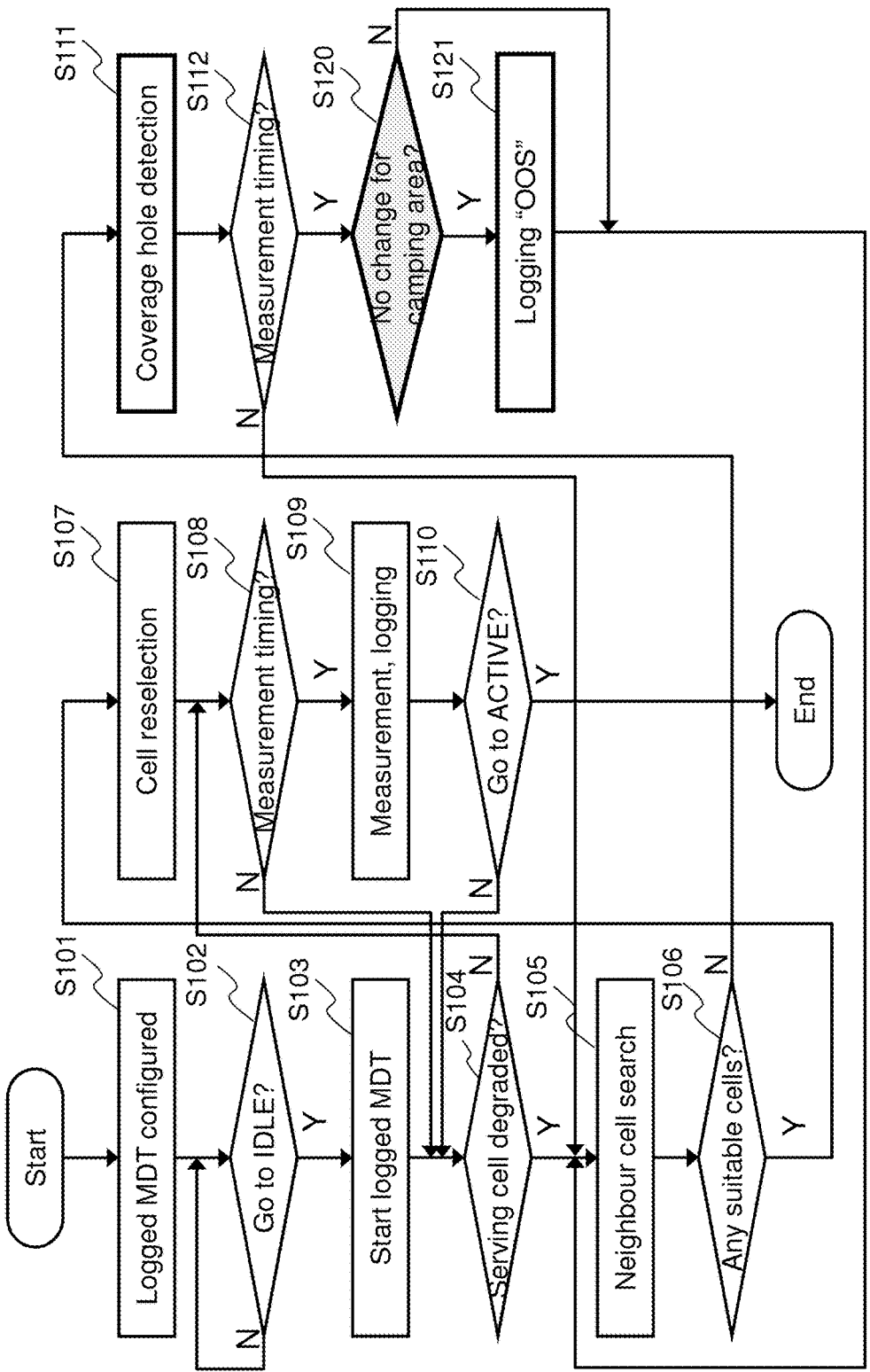
FIG. 15 is a flowchart describing an example of operations of a radio terminal of a fourth exemplary embodiment of the present invention.

FIG. 15 is a flowchart describing operation of the radio terminal (UE) of the fourth exemplary embodiment of the present invention. FIG. 15 corresponds to case (I) described above.

When the radio terminal (UE) is in an active mode, a measurement instruction acquisition unit 11 receives a Logged MDT configuration message from an eNB/RNC, and performs a Logged MDT setting (step S101).

When the radio terminal (UE) goes into an idle mode (Y in step S102), a Logged MDT is started by a measurement execution unit 12 (step S103).

When the received quality of a serving cell degrades (Y branch in step S104), the radio terminal (UE) performs a neighboring cell search by a cell detection unit 14 (step S105).

As a result of the neighboring cell search, in a case where a suitable cell is present (Y in step S106), the radio terminal (UE) performs cell reselection for the corresponding cell (step S107).

When measurement timing arrives (Y in step S108), the radio terminal (UE) in an idle mode performs measurement of the serving cell by a measurement unit 123 of the radio terminal (UE), and logs measurement result in a measurement result holding unit 124 (S109). At this time, the radio terminal (UE) may also perform measurement and logging as necessary for neighboring cells.

The radio terminal (UE) establishes a radio link with the eNB/RNC, and when the radio terminal (UE) goes from an idle mode to an active mode (Y in step S110), processing is ended, while in case of an idle mode (N in step S110), control returns to step S104.

As a result of the neighboring cell search (step S105), in a case where a suitable cell is not present (N in step S106), the radio terminal (UE) detects that the radio terminal (UE) camps in a coverage hole (step S111), and if the time is not measurement timing (N in step S112), moves to step S105; but if the time is measurement timing (Y in step S112), a check is made as to whether or not update processing has been performed for the area in which the radio terminal (UE) camps (S120: No Change for camping area). In a case where update processing has not been performed (Y branch in step S120), the radio terminal (UE) logs "OOS" (outside of operation range) (step S121).

That is, in the present exemplary embodiment, an area immediately before detecting the coverage hole is an area specified as a target of Logged MDT, and as long as the area is not updated, for an area in which the coverage hole has been detected, the radio terminal (UE) regards a Logged MDT to be left valid, and logs "OOS" (outside of operation range).

First Modified Example of Fourth Exemplary Embodiment

FIG. 16 is a flowchart of another example of operations of the radio terminal of the fourth exemplary embodiment of the present invention. FIG. 16 is different from FIG. 15 in the point that, in FIG. 15 after coverage hole detection, a decision is made as to whether or not to log "OOS" (step S121 in FIG. 15) according to whether or not update processing of a camped area has been performed (step S120 in FIG. 15), while in FIG. 16, from detecting that a preset condition of a cell, which is suitable for camping with regard to received quality of a serving cell, is no longer satisfied (Y in step S104 of FIG. 16), until a determination of a coverage hole is made (step S123 in FIG. 16), in a case where there is no update processing of the camped area (Y in step S120 of FIG. 16), logging of measurement of an (old) serving cell or neighboring cell and measurement results is continued (step S122 of FIG. 16). After a radio terminal (UE) determines that there is a coverage hole, the radio terminal (UE) suspends measurement and logging until the radio terminal (UE) detects a suitable cell again.

Figure 17B:
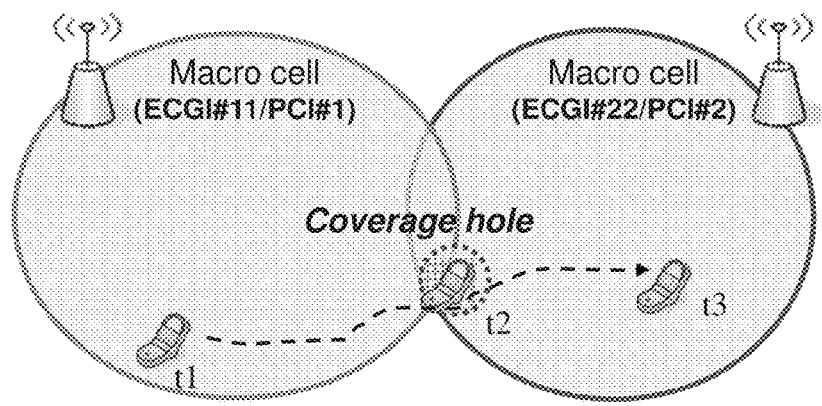
Figure 17C:
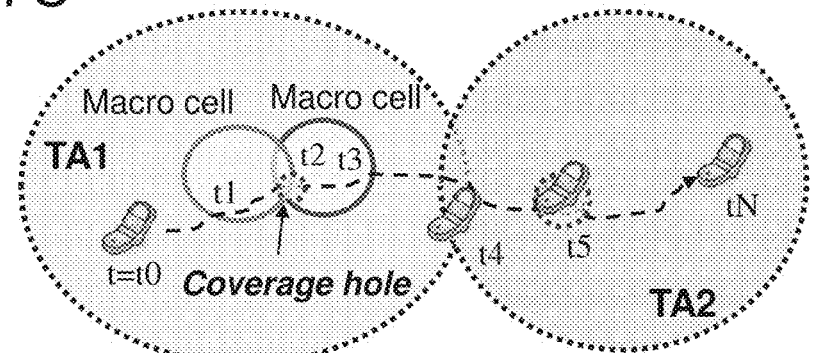

FIG. 17 is a diagram illustrating an example of a log of the fourth exemplary embodiment of the present invention. FIG. 17 is an example of LTE; a Logged MDT is valid only in tracking area TA1, and is invalid in tracking area TA2. The radio terminal (UE) performs measurement and logging periodically. FIG. 17B is an enlarged diagram of two macro cells and a coverage hole of FIG. 17C.

In FIG. 17B, the radio terminal (UE), that receives an instruction to periodically execute the Logged MDT, is in an idle mode and camps in the macro cell (ECGI#11/PCI#1). At time t=t1, the radio terminal (UE) performs measurement and logging for a serving cell and neighboring cell (ECGI#22/PCI#2). The radio terminal (UE) measures RSRP/RSRQ of the serving cell (ECGI#11), and RSRP of the neighboring cell (PCI#2), but not limited thereto, The radio terminal (UE) may also measure RSRQ of the neighboring cell.

At time t=t2, the quality of the serving cell degrades and the radio terminal (UE) detects a coverage hole. At this time, since a tracking area in which the radio terminal (UE) camps is TA1, the radio terminal (UE) logs "OOS". With regard to whether or not the radio terminal (UE) in camped in TA1, as an example, there is a method to determine whether or not a Tracking Area Update (TAU) has been performed from the TA before detection of the coverage hole.

At time t=t3, the radio terminal (UE) performs measurement and logging of a serving cell (ECGI#22) and a neighboring cell (PCI#1).

At time t=t4, a cell/tracking area update (TAU) is performed.

In FIG. 17C, the radio terminal (UE) camps in tracking area TA2 and detects a coverage hole at t=t5, but since the tracking area is outside of TA1, the radio terminal (UE) does not log "OOS".

It is to be noted that in FIG. 16, instead of logging "OOS", in a case where there is no update processing of the camped area, from a time when the radio terminal (UE) detects that received quality of a serving cell does not satisfy a preset condition for a cell, where it is suitable for the radio terminal (UE) to camp (Y in step S104 of FIG. 16), until the radio terminal (UE) determines a coverage hole (step S123 in FIG. 16), the radio terminal (UE) may continue measurement of an (old) serving cell or neighboring cell and logging of the measurement result.

First Modified Example of Fourth Exemplary Embodiment

Figure 18:
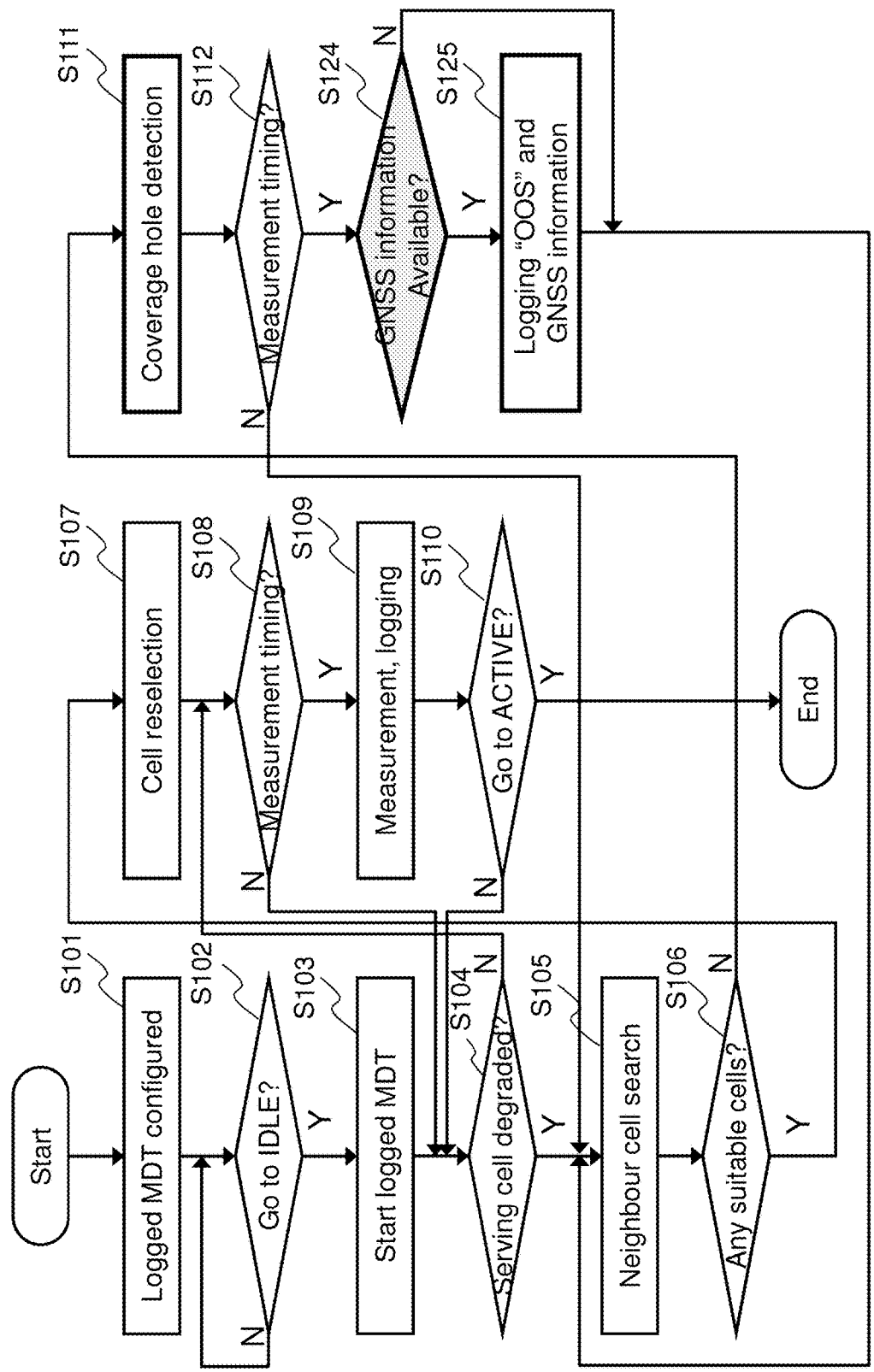
FIG. 18 is a flowchart describing operations of a radio terminal of a first modified example of the fourth exemplary embodiment of the present invention.

FIG. 18 is a flowchart illustrating operations of the radio terminal (UE) of a first modified example of the fourth exemplary embodiment of the present invention. In FIG. 18, the same step numbers are given to steps that are the same as in FIG. 15. The first modified example corresponds to the case (II) described above. In a case where when detecting a coverage hole, there is available GNSS information, the radio terminal (UE) logs "OOS".

In the first modified example, when detecting a coverage hole (step S111), and if measurement time arrives (Y in step S112), a control unit 15 of the radio terminal (UE) checks whether GNSS information is available (step S124). If the GNSS information is available (Y in step S124), the radio terminal (UE) logs "OOS" and the GNSS information (step S125). It is to be noted that the radio terminal (UE) has a receiver that acquires the GNSS information.

Second Modified Example of Fourth Exemplary Embodiment

Figure 19:
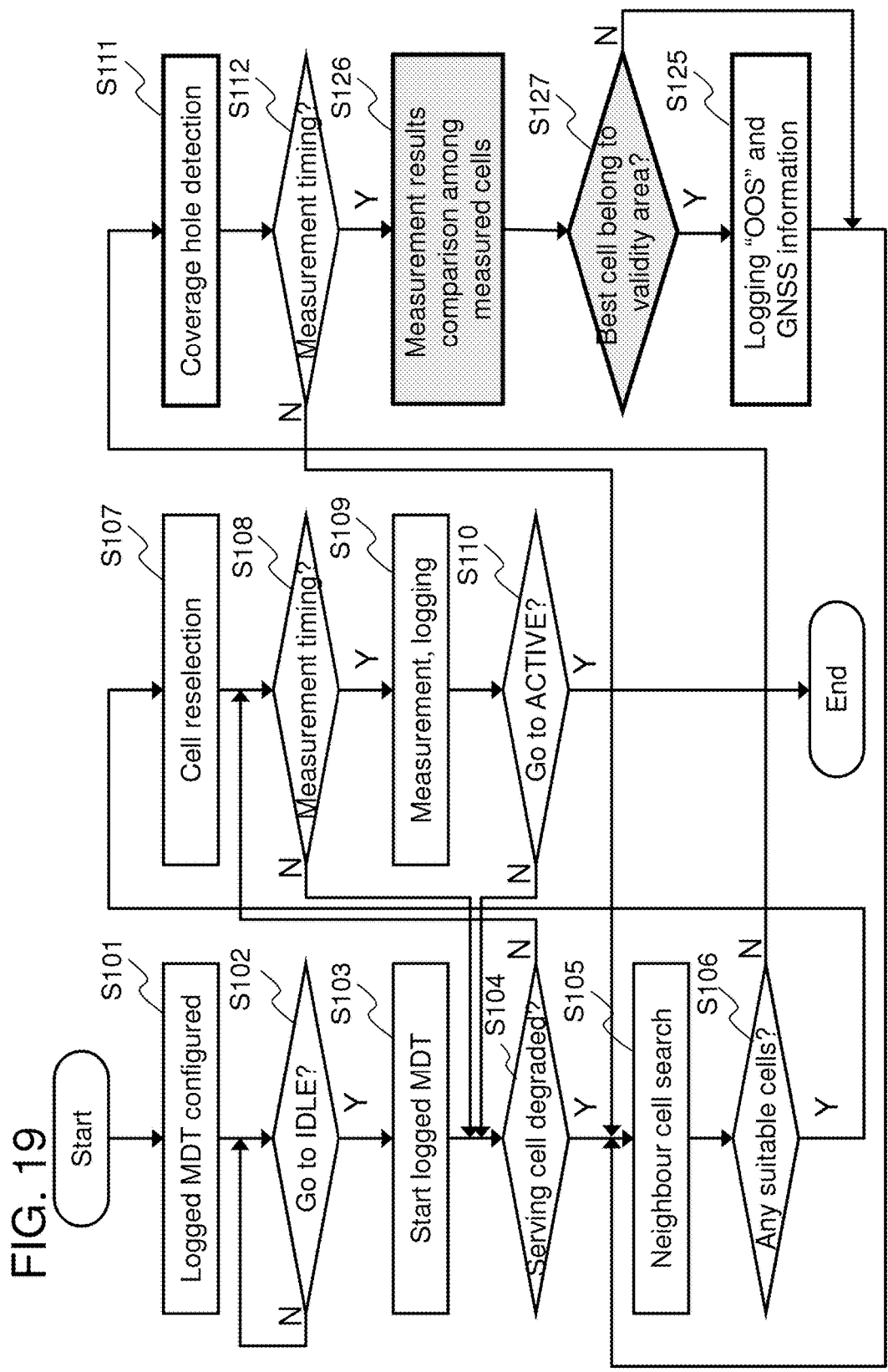
FIG. 19 is a flowchart describing operations of the radio terminal of a second modified example of the fourth exemplary embodiment of the present invention.

FIG. 19 is a flowchart illustrating operations of the radio terminal (UE) of a second modified example of the fourth exemplary embodiment of the present invention. The second modified example of the fourth exemplary embodiment corresponds to case (III) described above. The radio terminal (UE), upon detecting a coverage hole, logs "OOS" if a cell with the highest measured RSRP/RSCP belongs to a Logged MDT target area (ECGI/CGI). In FIG. 19, the same step numbers are given to steps that are the same as in FIG. 15.

In the second modified example, when the radio terminal (UE) detects a coverage hole (step S111), and when measurement time arrives (Y in step S112), the measurement execution unit 12 of the radio terminal (UE), compares measurement results RSRP/RSCP of the cells for which measurement are performed (step S126). The measurement execution unit 12a checks whether or not the best cell having the highest RSRP/RSCP belongs to a Logged MDT validity area (step S127: Best cell belongs to validity area). If the best cell belongs to the validity area (Y in step S127), the radio terminal (UE) logs "OOS" and GNSS information (step S125). It is to be noted that instead of RSRP/RSCP, RSRQ/Ec/No may be used.

In the present exemplary embodiment, the radio terminal (UE) logs "OOS", in a case where the radio terminal (UE) that camps in the coverage hole searches neighboring cells and there is no not allowed cell in which the radio terminal is not allowed to be served for receiving (performing) a predetermined service, for example, a normal service, and logs "OOS" and information of the one or more not allowed cells, in a case where there is one or more not allowed cells (in a case where a not allowed cell is present, the cell information to be logged is RSRP/RSCP, PCI/PSC of the corresponding cell).

Fifth Exemplary Embodiment

The following describes a fifth exemplary embodiment of the present invention. As described in the fourth exemplary embodiment, a second condition on measurement or logging when a coverage hole is encountered (detected) is one of the following conditions (1) to (4), or a combination thereof. It is to be noted that in the present exemplary embodiment, a condition of logging "OOS" is shown as an example of the second condition.

(1) A Logged MDT was valid immediately before a coverage hole occurs (MDT measurement has been executed).
(2) An area (PLMN, Cell/TA/LA/RA) immediately before a coverage hole occurs is a Logged MDT target area.
(3) Available GNSS information is held.
(4) A cell with largest RSRP/RSCP (or RSRQ/Ec/No) belongs to a Logged MDT target area (ECGI/CGI).

It is to be noted that these conditions can also be applied to exemplary embodiments of the present invention which, in case of detecting a coverage hole, record information (neighbor information) related to a not allowed cell in a neighborhood, in which a radio terminal is not allowed to be served for receiving (performing) a predetermined service, for example, a normal service. Furthermore, application of these conditions is possible also to operations in a stage before detecting a coverage hole.

In the fourth exemplary embodiment, with respect to the abovementioned condition (2), when a coverage hole is detected, as long as there is no area update from an immediately previous area (specified as a Logged MDT target area), the Logged MDT is regarded to be valid.

In the present exemplary embodiment, from a time of detection of a coverage hole until elapse of a preset time, or until execution of a preset number of measurements and logs, the radio terminal (UE) performs measurement and logging of received quality of a neighboring cell (non-member CSG).

The abovementioned condition (3) is that available GNSS information is held. Only "OOS" with no location information may be considered as a lack of information.

With regard to the abovementioned condition (4), even if system information (Master Information Block: MIB/System Information Block: SIB) cannot be acquired, RSRP/RSCP can be acquired. A determination is made as to whether there is PCI/PSC that has been logged in the past.

In the present exemplary embodiment, the radio terminal (UE) holds also in a log and reports the PCI/PSC of a cell with maximum (highest) RSRP/RSCP.

Figure 20:
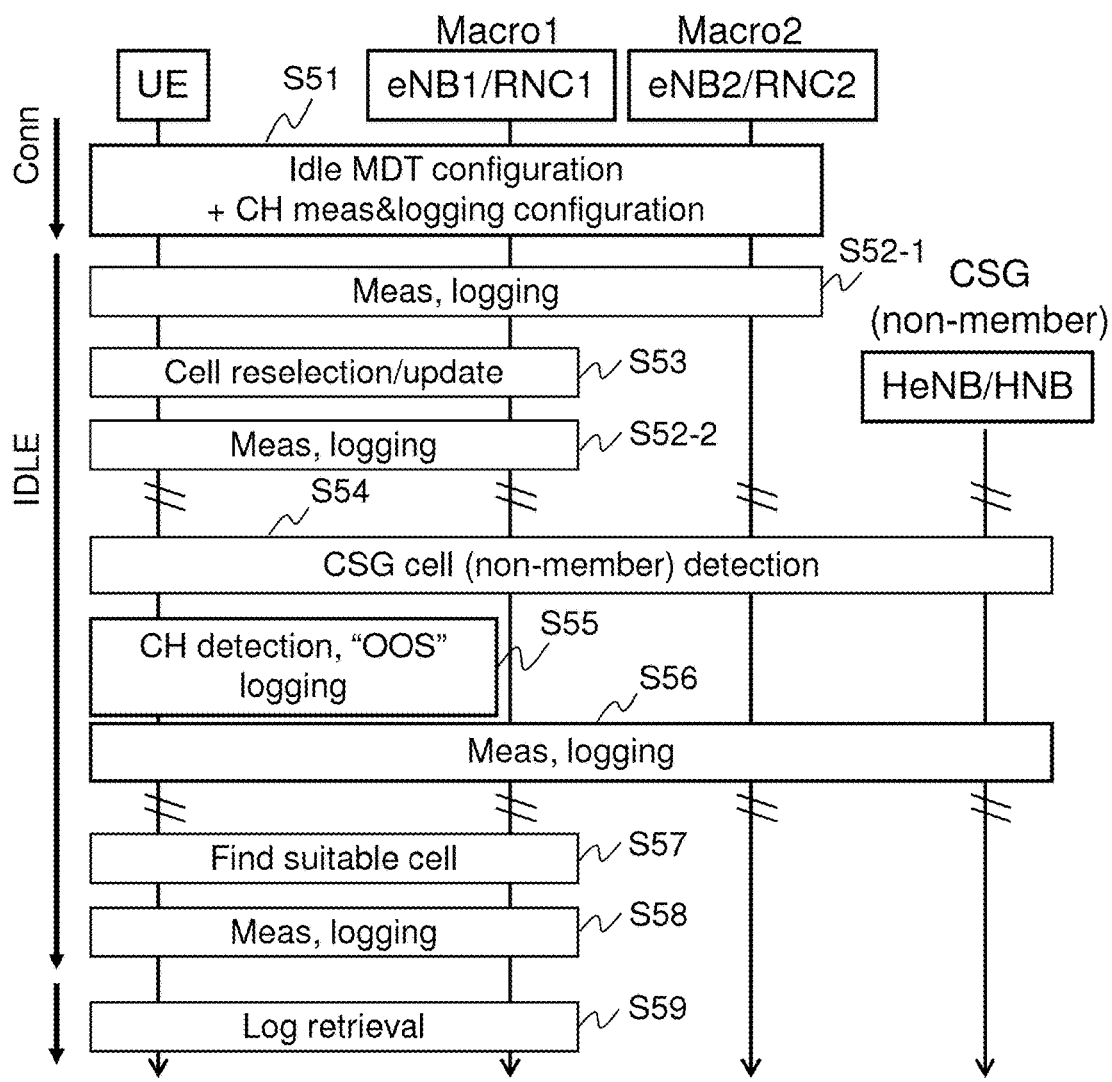
FIG. 20 is a diagram illustrating sequence operations of a fifth exemplary embodiment of the present invention.

FIG. 20 is a diagram illustrating sequence operations of a system of the fifth exemplary embodiment of the present invention.

An eNB/RNC of a macro cell 2 instructs a radio terminal (UE) in an active mode with a configuration message to perform measurement and logging of a non-member CSG cell, in a case where a non-member CSG cell is present in the neighborhood, when a coverage hole (CH) is detected (S51: Idle MDT configuration+CH measurement & logging configuration). A measurement instruction acquisition unit 11 of the radio terminal (UE) receives the message, acquires the abovementioned instruction, and controls the measurement execution unit 12.

When the radio terminal (UE) goes into an idle mode, the measurement execution unit 12 of the radio terminal (UE) performs measurement and logging periodically (S52-1).

The radio terminal (UE) performs reselection/updating of the cell (S53: Cell reselection/update). In FIG. 20, the radio terminal (UE) selects macro cell 1 after macro cell 2.

The measurement execution unit 12 of the radio terminal (UE) periodically performs measurement and logging (S52-2).

The radio terminal (UE) detects that a non-member CSG cell is present in the neighborhood (S54: CSG cell (non-member) detection).

On detecting a coverage hole, the measurement execution unit 12 of the radio terminal (UE) performs logging of "OOS" (S55: CH detection+"OOS" logging).

After detecting a coverage hole, the measurement execution unit 12 of the radio terminal (UE) performs measurement of received quality of a neighboring cell and a non-member CSG cell, and performs logging (S56).

The cell detection unit 14 of the radio terminal (UE) detects a suitable cell (macro cell 1) (S57: Find suitable cell).

The measurement execution unit 12 of the radio terminal (UE) performs measurement and logging of the macro cell 1 (S58).

The control unit 15 of the radio terminal (UE) establishes a radio link with the eNB/RNC of the macro cell 1, the radio terminal (UE) is in an active mode, and the measurement result reporting unit 13 of the radio terminal (UE) reports a holding log of the measurement result to the eNB/RNC of the macro cell 1 (S59: Log retrieval).

According to the present exemplary embodiment, when the radio terminal (UE) detects a coverage hole, by performing measurement and logging of received quality of a neighboring cell (non-member CSG cell) until a preset number of measurements and logs is reached, it is possible to acquire detailed information of the coverage hole neighborhood.

Figures 21A, 21B:
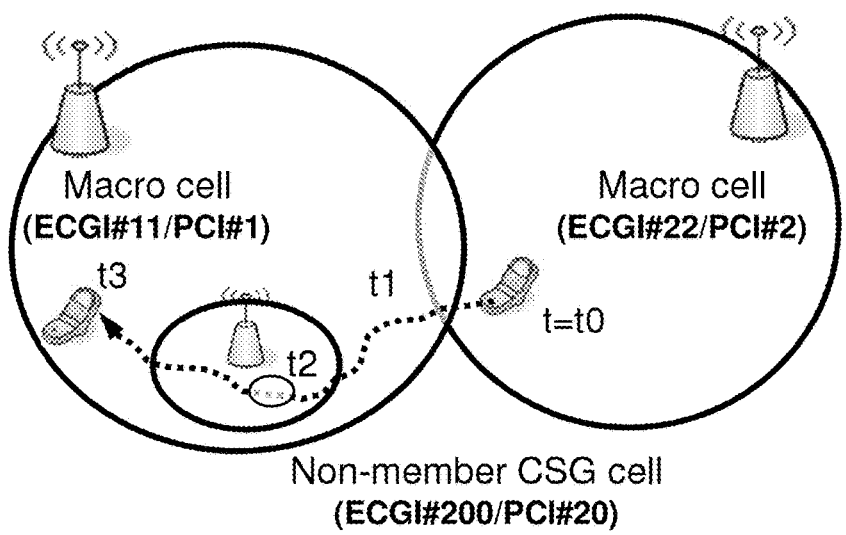
FIGS. 21A and 21B are diagrams illustrating an example of a log of the fifth exemplary embodiment of the present invention.
Figure 22:
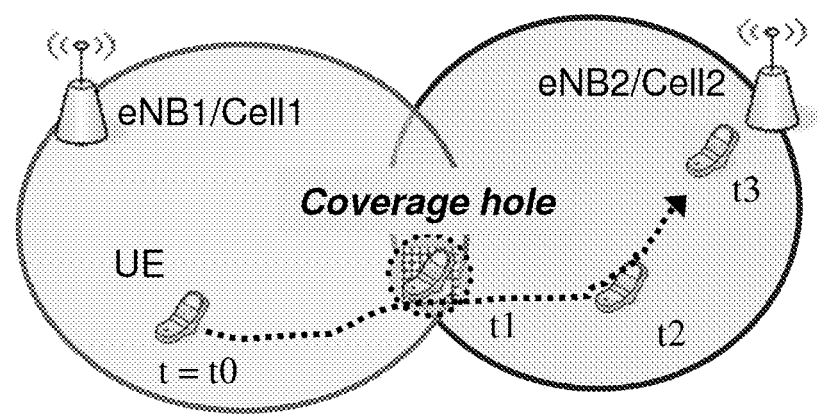
FIG. 22 is a schematic diagram illustrating operations when a coverage hole is detected according to a Logged MDT.
Figure 23A:
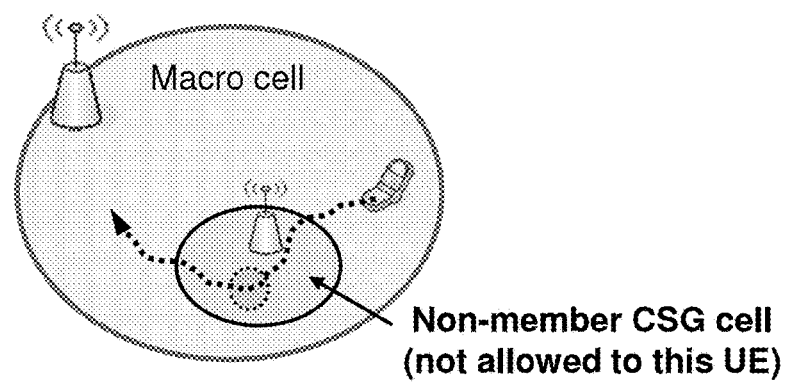
FIGS. 23A and 23B are diagrams for describing problems of related technology.
Figure 23B:
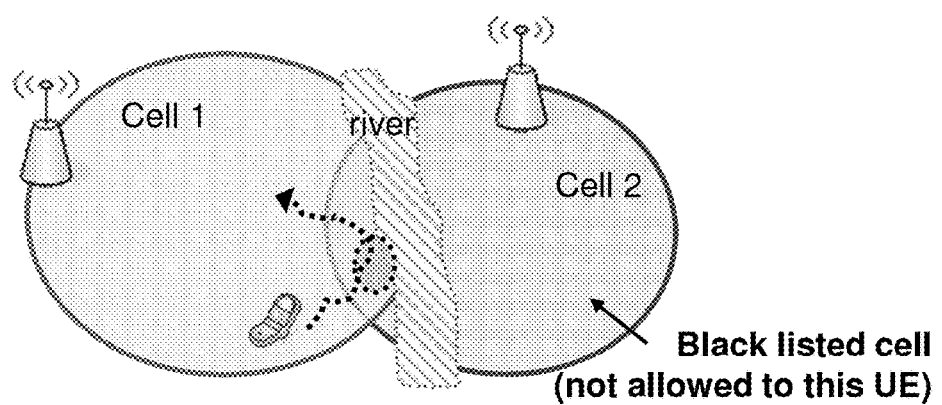

FIG. 21 is a diagram illustrating a log of a Logged MDT in the fifth exemplary embodiment of the present invention. FIG. 21A shows an example of a log of a Logged MDT at various timings of FIG. 21B. The radio terminal periodically performs measurement and logging. An ECGI#200/PCI#20 cell is a non-member CSG cell, and is not allowed to be served.

In FIG. 21B, the radio terminal (UE) that receives an instruction to periodically execute the Logged MDT is into an idle mode and camps in the macro cell 2 (ECGI#22/PCI#2). At time t=t0, the radio terminal (UE) performs measurement and logging for a serving cell and neighboring cell (ECGI#11/PCI#1). The measurement result is of RSRP/RSRQ for the serving cell (ECGI#22), and RSRP for the neighboring cell (PCI#1).

The radio terminal (UE) moves from the macro cell 2 to the macro cell 1, and at timing t=t1 performs measurement and logging of the serving cell (ECGI#11/PCI#1) and the neighboring cell (ECGI#22/PCI#2). The measurement result is of RSRP/RSRQ for the serving cell (ECGI#11), and of RSRP for the neighboring cell (PCI#2). It is to be noted that RSRQ/Ec/No may be measured for the neighboring cell.

At time t=t2, the quality of the serving cell degrades and the radio terminal (UE) detects a coverage hole. At this time, the radio terminal (UE) measures received quality of the non-member CSG cell, and performs logging of "OOS" for the serving cell (ECGI#11), and of RSRP and an ID (PCI#20) for the non-member CSG cell.

At time t=t3, the radio terminal (UE) detects the presence of a not allowed cell in the neighborhood, and performs logging of a measurement result of the serving cell (ECGI#22), and a measurement result RSRP/RSRQ and the cell ID (PCI#20) of the non-member CSG cell, or a measurement result and the ID (ECGI#200) of a macro cell which is another neighboring cell.

In the exemplary embodiment described above, a description was given with "(a) a situation has been detected in which selection of a first cell was not possible", or "(b) received quality of a serving cell during connection no longer satisfies a cell selection criteria", as one "first condition", as an example. However, the above described exemplary embodiment of the present invention is, as a matter of course, also applicable with regard to other first conditions: "(c) a preset time-period has elapsed after received quality of a serving cell, while a radio terminal is connected, no longer satisfies a cell selection criteria", or "(d) a radio terminal has moved to a state where detection of the second cell is performed".

For example, in case of using (c), a step may be added, before the first condition is satisfied in the example of (b), wherein the step is for determining whether or not a preset time-period has elapsed after a cell selection criteria is no longer satisfied, using a timer held by a radio terminal.

The present invention may also be applied using (d) with "a radio terminal has moved to a state where detection of the second cell is performed" as "moved to 'Any cell selection' state or a 'Camped on any cell' state".

In the exemplary embodiments described above, a description was given focusing on a "coverage hole", but application is also possible to other coverage problems. An example thereof is "pilot pollution".

"Pilot pollution" is a phenomenon occurring in a situation (area), for example, where due to overlap among neighboring cells being large, interference level is high, serving cell received power is also (relatively) high, and cell performance (throughput or the like) is low.

As "first conditions" corresponding to the pilot pollution, the following examples may be cited:
"received quality of a serving cell while a radio terminal being served is less than a first level, and received quality of (at least one) neighboring cell is greater than or equal to a second level", or
"received quality of a serving cell while a radio terminal being served is less than a third level, and received quality of (at least one) neighboring cell is greater by a preset offset (positive or negative value) than the received quality of the serving cell".

In case of these first conditions being satisfied, the radio terminal records (logging) of information (neighbor information) related to a cell in which the radio terminal is not allowed to be served for receiving (performing) a predetermined service.

It is to be noted that it is possible for a radio terminal to perform logging of the relevant neighbor information only once at a point in time when a relevant first condition is satisfied, or it is possible for the radio terminal to continue logging of the relevant neighbor information (for example, periodically) all the time the relevant first condition is satisfied. In the latter case, for example, the radio terminal may suspend logging when the radio terminal detects a coverage hole afterwards.

Based on a report of the relevant neighbor information from a radio terminal, a radio network side is able to recognize a coverage problem (pilot pollution in this case), and to execute appropriate coping processing (optimization).

Here, as the location information, besides GNSS location information, location information acquired in a LCS (Location Service) session may be used. As information added when a coverage hole in radio coverage is detected by a radio terminal, a terminal mode may be reported, such as the terminal being in a folded state, or when a backlight is flashing, or a terminal situation such as a moving speed of the terminal may be reported.

The respective disclosures of the Non Patent Literatures described above are hereby incorporated by reference into this specification. The exemplary embodiments and examples may be changed and adjusted within the scope of the entire disclosure (including the scope of the claims) of the present invention and based on fundamental technological concepts thereof. Furthermore, a wide variety of combinations and selections of various disclosed elements (including respective elements of the respective claims, respective elements of the respective exemplary embodiments, respective elements of the respective drawings, and the like) is possible within the scope of the claims of the present invention. That is, the present invention, as a matter of course, includes every type of transformation and modification that a person skilled in the art can realize according to the entire disclosure including the scope of the claims and to technological concepts thereof.

The invention claimed is:

1. A radio communication system, wherein a radio terminal, including at least one processor, upon acquiring measurement instruction information from a radio station, performs measurement and logging in accordance with the measurement instruction information, and reports to the radio station, the radio terminal comprising:
   a measurement execution unit, within at least one of said at least one processor, that, when finding that a first condition on selection or detection of a first cell in which the radio terminal is allowed to be served for a predetermined service, is satisfied, and a second condition on measurement or logging is satisfied, logs information on a second cell in which the terminal is not allowed to be served for the predetermined service, wherein the first condition comprises at least one of:
   the radio terminal detecting a situation in which selection of the first cell is not possible;
   received quality of a serving cell while the radio terminal being served, no longer satisfying a cell selection criteria;
   elapse of a preset time-period, while the radio terminal being served, since received quality of a serving cell no longer satisfies a cell selection criteria; and
   transition of the radio terminal to a state in which the radio terminal performs detection of the second cell is performed.

2. The radio communication system according to claim 1, wherein the second cell is a cell in which the radio terminal is allowed to be served only in order for the radio terminal to receive a predetermined limited service, and/or a cell that bars to be connected.

3. The radio communication system according to claim 1, wherein the radio terminal comprises
   a measurement result reporting unit, within at least one of said at least one processor, that, after detection of a situation in which detection of the first cell is not possible, in a case where the first cell is once again detected, notifies the radio station of a measurement result including information on the second cell, autonomously or in response to an instruction from the radio station.

4. The radio communication system according to claim 1, wherein, in case of the first condition being satisfied, the radio terminal determines whether or not the second cell is present in the neighborhood thereof, and records information on the second cell.

5. The radio communication system according to claim 4, wherein the radio terminal performs a determination as to whether the second cell is present, based on either: whether or not received quality of a downlink given signal of the second cell is greater than or equal to a preset value, or whether or not system information can be correctly acquired.

6. The radio communication system according to claim 4, wherein, in a case where the second cell is present in the neighborhood, the radio terminal executes measurement for the second cell, and records a measurement result as information on the second cell.

7. The radio communication system according to claim 1, wherein the radio terminal includes information on whether the second cell is present or absent and/or an identifier of the second cell in the information on the second cell.

8. The radio communication system according to claim 1, wherein the radio station or the operation administration and maintenance server decides and executes a process to solve a situation in which detection of the first cell is not possible, in accordance with presence or absence of the second cell reported from the radio terminal.

9. The radio communication system according to claim 1, wherein the radio station and/or the operation administration and maintenance server,
   in a case where a report from the radio terminal indicates that the second cell is present in the neighborhood, executes an interference avoidance process, and
   in a case where a report from the radio terminal indicates that the second cell is not present in the neighborhood, executes coverage optimization.

10. The radio communication system according to claim 1, wherein the second condition comprises at least one of:
   a condition where, before the radio terminal satisfies the first condition, the measurement instruction information is valid;
   a condition where, before the radio terminal satisfies the first condition, the last serving area belongs to a predetermined preset area;
   a condition of holding valid location information at a point in time when the first condition is satisfied; and
   a condition where an area, in which received quality of a downlink given signal assumes maximum at a point in time when the first condition is satisfied, belongs to a preset area.

11. The radio communication system according to claim 10, wherein, in a case where based on a condition that before the radio terminal detects a situation in which detection of the first cell is not possible, an area in which the radio terminal is last served belongs to a predetermined preset area, the radio terminal continues logging at the preset timing, while there is no update of the area in which the radio terminal is served, and/or until an elapse of a preset time-period after detection of a situation in which detection of the first cell is not possible.

12. The radio communication system according to claim 10, wherein, in case of detecting a situation in which detection of the first cell is not possible, the radio terminal records an identifier of an area in which received quality of a downlink given signal assumes maximum.

13. A radio terminal, including at least one processor, comprising:
a unit, within at least one of said at least one processor, that receives measurement instruction information transmitted from a radio station; and
performs measurement and logging in accordance with the measurement instruction information, the measurement execution unit, within at least one of said at least one processor, in case of a first condition on selection or detection of a first cell in which the terminal is allowed to be served for a predetermined service being satisfied, and a second condition on measurement or logging being satisfied, recording information on a second cell in which the terminal is not allowed to be served for the predetermined service, wherein the first condition comprises at least one of:
the radio terminal detecting a situation in which selection of the first cell is not possible;
received quality of a serving cell, while the radio terminal being served, no longer satisfying a cell selection criteria;
elapse of a preset time-period, while the radio terminal being served, since received quality of a serving cell no longer satisfies a cell selection criteria; and
transition of the radio terminal to a state where detection of the second cell is performed.

14. The radio terminal according to claim 13, wherein the second condition comprises at least one of:
a condition where, before the radio terminal satisfies the first condition, the measurement instruction information is valid;
a condition where, before the radio terminal satisfies the first condition, the last serving area belongs to a predetermined preset area;
a condition of holding valid location information at a point in time when the first condition is satisfied; and
a condition where an area, in which received quality of a downlink given signal assumes maximum at a point in time when the first condition is satisfied, belongs to a preset area.

15. A radio station of a radio communication system, wherein a radio terminal that receives measurement instruction information from the radio station performs measurement and logging in accordance with the measurement instruction information, and in case of a first condition on selection or detection of a first cell in which the radio terminal is allowed to be served for a predetermined service being satisfied, and a second condition on measurement or logging being satisfied, logs information on a second cell in which the terminal is not allowed to be served for the predetermined service, and reports to the radio station side, wherein the radio station,
in a case where a report from the radio terminal that detects a situation in which detection of the first cell in which a radio terminal is allowed to be served, is not possible, indicates that the second cell in which the radio terminal is not allowed to be served, is present in the neighborhood, executes a change of a network configuration of either the first cell or the second cell, as a strategy for reducing interference between the first cell and the second cell, and
in a case where a report from the radio terminal indicates that the second cell is not present in the neighborhood, executes a change of a network configuration related to coverage of the first cell,
wherein the first condition includes at least one of:
received quality of a serving cell, while the radio terminal being served, no longer satisfying a cell selection criteria;
elapse of a preset time-period since received quality of a serving cell, while the radio terminal being served, no longer satisfies a cell selection criteria; and
transition of the radio terminal to a state where detection of the second cell is performed.

16. The radio station according to claim 15,
wherein
the second condition comprises at least one of:
a condition where, before the radio terminal satisfies the first condition, the measurement instruction information is valid;
a condition where, before the radio terminal satisfies the first condition, the last serving area belongs to a predetermined preset area;
a condition of holding valid location information at a point in time when the first condition is satisfied; and
a condition where an area, in which received quality of a downlink given signal assumes maximum at a point in time when the first condition is satisfied, belongs to a preset area.

17. An operation administration and maintenance server that performs operation administration and maintenance of a radio communication system, wherein a radio terminal that receives measurement instruction information from a radio station, performs measurement and logging in accordance with the measurement instruction information, and in case of a first condition on selection or detection of a first cell in which the terminal is allowed to be served for a predetermined service being satisfied, and a second condition on measurement or logging being satisfied, logs information on a second cell in which the terminal is not allowed to be served for the predetermined service, and reports to the radio station side, wherein the operation administration and maintenance server performs control so that
in a case where a report from the radio terminal that detects a situation in which detection of the first cell in which the radio terminal is allowed to be served is not possible, indicates that the second cell in which the radio terminal is not allowed to be served, is present in a neighborhood, a network configuration of either the first cell or the second cell is changed, as a strategy for reducing interference between the first cell and the second cell, and
in a case where a report from the radio terminal indicates that the second cell is not present in the neighborhood, a network configuration related to coverage of the first cell is changed,
wherein the first condition includes at least one of:
received quality of a serving cell, while the radio terminal being served, no longer satisfying a cell selection criteria;
elapse of a preset time-period since received quality of a serving cell, while the radio terminal being served, no longer satisfies a cell selection criteria; and transition of the radio terminal to a state where detection of the second cell is performed.

18. The operation administration and maintenance server according to claim 17,
wherein
the second condition comprises at least one of:
a condition where, before the radio terminal satisfies the first condition, the measurement instruction information is valid;
a condition where, before the radio terminal satisfies the first condition, the last serving area belongs to a pre-determined preset area;
a condition of holding valid location information at a point in time when the first condition is satisfied; and
a condition where an area, in which received quality of a downlink given signal assumes maximum at a point in time when the first condition is satisfied, belongs to a preset area.

19. A radio communication method comprising:
a radio terminal acquiring measurement instruction information from a radio station; and
the radio terminal performing measurement and logging in accordance with the measurement instruction information and reports to the radio station,
the radio terminal, in case of a first condition on selection or detection of a first cell in which the radio terminal is allowed to be served for reception of a predetermined service being satisfied, and a second condition on measurement or logging being satisfied, logging information on a second cell in which the terminal is not allowed to be served for reception of the predetermined service, wherein the first condition includes at least one of:
the radio terminal detecting a situation in which selection of the first cell is not possible;
received quality of a serving cell, while the radio terminal being served, no longer satisfying a cell selection criteria;
elapse of a preset time-period, while the radio terminal being served, since received quality of a serving cell no longer satisfies a cell selection criteria; and
transition of the radio terminal to a state where detection of the second cell is performed.

20. The radio communication method according to claim 19, wherein
the second condition comprises at least one of:
a condition where, before the radio terminal satisfies the first condition, the measurement instruction information is valid;
a condition where, before the radio terminal satisfies the first condition, the last serving area belongs to a pre-determined preset area;
a condition of holding valid location information at a point in time when the first condition is satisfied; and
a condition where an area, in which received quality of a downlink given signal assumes maximum at a point in time when the first condition is satisfied, belongs to a preset area.

21. The radio communication method according to claim 19, wherein the second cell is a cell in which the radio terminal is allowed to be served only in order for the radio terminal to receive a predetermined limited service, and/or a cell that bars to be connected.

22. The radio communication method according to claim 19, comprising, after detection of a situation in which detection of the first cell is not possible, in a case where the first cell is once again detected, the radio terminal notifying the radio station of a measurement result including information on the second cell, autonomously or in response to an instruction from the radio station.

23. A radio communication system, including at least one processor, comprising:
a radio terminal;
a radio station that connects and communicates over a radio with the radio terminal under its control; and
an operation administration and maintenance server device that performs operation administration and maintenance of a radio network including the radio station, wherein
the radio terminal comprises:
a measurement instruction acquisition unit, within at least one of said at least one processor, that receives a configuration message instructing measurement and logging by the radio terminal in an idle mode, from the radio station side; and
a measurement execution unit, within at least one of said at least one processor, that performs measurement of received quality of a serving cell and a neighboring cell, in an idle mode, and logging of a measurement result, in accordance with content of the instruction of the configuration message; wherein
the measurement execution unit, in case of a first condition on selection or detection of a first cell in which the terminal is allowed to be served for reception of a predetermined service being satisfied, and of a second condition on measurement or logging being satisfied, records at least one of:
identification information of the second cell in which the radio terminal is not allowed to be served, acquired by the radio terminal; and
a measurement result of received quality of a downlink given signal of the second cell in which the radio terminal is not allowed to be served, measured by the radio terminal, and wherein
the radio terminal comprises
a measurement reporting unit, within at least one of said at least one processor, that, when the radio terminal establishes a radio link with the radio station and goes to an active mode, reports the recorded content to the radio station, and wherein
the radio station that receives the recorded content report from the radio terminal transmits the report to the operation administration and maintenance server, and
the operation administration and maintenance server analyses the report from the radio terminal, and decides a strategy for solving the radio coverage failure, in accordance with whether or not a cell in which the radio terminal is not allowed to be served is present in the neighborhood of an area in which the radio coverage failure was detected,
wherein the first condition includes at least one of:
received quality of a serving cell, while the radio terminal being served, no longer satisfying a cell selection criteria;
elapse of a preset time-period has since received quality of a serving cell, while the radio terminal being served, no longer satisfies a cell selection criteria; and
transition of the radio terminal to a state where detection of the second cell is performed.

24. The radio communication system according to claim 23,
wherein
the second condition comprises at least one of:
a condition where, before the radio terminal satisfies the first condition, the measurement instruction information is valid;
a condition where, before the radio terminal satisfies the first condition, the last serving area belongs to a predetermined preset area;
a condition of holding valid location information at a point in time when the first condition is satisfied; and
a condition where an area, in which received quality of a downlink given signal assumes maximum at a point in time when the first condition is satisfied, belongs to a preset area.

25. The radio communication system according to claim 23, wherein the radio coverage failure is a coverage hole, and the system executes at least one among (A) to (K), in accordance with content of the measurement instruction from the radio station side:
(A) on detecting a coverage hole, the radio terminal records the existence of the coverage hole, and in addition, determines whether or not the second cell in which the radio terminal is not allowed to be served for receiving a predetermined service is present in the neighborhood thereof, and in case of being present, records information on the neighboring second cell;
(B) when received quality of a serving cell degrades, a determination is made as to whether or not a cell is present that allows a connection of only a predetermined specified radio terminal related to a predetermined service, as the second cell in the neighborhood, and
in a case where a coverage hole is detected, received quality of a cell in which a radio terminal is allowed to be served for only the specified radio terminal is measured, and the coverage hole and a measurement result of the second cell in which a radio terminal is allowed to be served for only the specified radio terminal are recorded;
(C) measurement and logging of a serving cell and a neighboring cell are performed in a time-period after detection of degrading of received quality of the serving cell and until a coverage hole is detected, and in case of detecting a cell in which a radio terminal is allowed to be served for only a predetermined specified radio terminal, as the second cell in the neighborhood, measurement and logging of a measurement result are performed for the cell in which a radio terminal is allowed to be served for only the specified radio terminal, and
after the coverage hole detection, measurement and logging are suspended until a suitable first cell in which a radio terminal is allowed to be served is detected once again;
(D) when received quality of a serving cell degrades, a determination is made as to whether or not a cell is present that belongs to a list of specified cells designated in advance so as not to perform neighboring cell measurement in the neighborhood, and
in case of detecting a coverage hole, measurement of received quality of a cell belonging to the list is performed, and the coverage hole and a measurement result of the cell belonging to the list are recorded;
(E) when received quality of a serving cell degrades, as the second cell, in the neighborhood, a determination is made as to whether or not a cell is present that allows a connection for only a predetermined specified radio terminal, and in case of detecting a coverage hole, information including the coverage hole and whether or not a cell is present that allows a connection for only the specific radio terminal, is recorded;
(F) measurement and logging of a serving cell and a neighboring cell are performed for a time-period after detection of degrading of received quality of a serving cell and until a coverage hole is detected, and as information of the second cell, logging is performed of information on a cell in which only a predetermined specified radio terminal is allowed to be served in the neighborhood, and after detection of the coverage hole, measurement and logging are suspended until a suitable first cell in which a radio terminal is allowed to be served is once again detected;
(G) when received quality of a serving cell degrades, a determination is made as to whether or not a cell is present that belongs to a list of specific cells designated in advance so as not to measure a neighboring cell in the neighborhood, and in case of detecting the coverage hole, logging is performed of information including the coverage hole and whether or not a cell belonging to the list is present;
(H) in case of the coverage hole being detected, information including the coverage hole and, as information of the second cell, whether or not a cell is present that allows a connection for only the specified radio terminal is recorded;
(I) in a case where when the coverage hole is detected, an area in which the radio terminal is present until immediately before the failure is detected is a measurement target area, and the area in which the radio terminal is present is not updated, the coverage hole, or a measurement result of a cell in which the radio terminal is not allowed to be served in the neighborhood of the coverage hole are recorded,
(J) in a case where when the coverage hole is detected, there is valid location information, the coverage hole is recorded; and
(K) in a case where when the coverage hole is detected, a cell with highest received quality belongs to a measurement target area, the coverage hole, or a measurement result of a cell in which the radio terminal is not allowed to be served in the neighborhood of the coverage hole are recorded.

26. The radio communication system according to claim 23, wherein
the operation administration and maintenance server, in a case where a report from the radio terminal indicates that a second cell in which the radio terminal is not allowed to be served for receiving a predetermined service is present in the neighborhood, makes a setting to execute an interference avoidance strategy with respect to the radio station, or the second cell in which the radio terminal is not allowed to be served, and
in a case where a report from the radio terminal indicates that a second cell in which the radio terminal is not allowed to be served for receiving a predetermined service is not present in the neighborhood, optimization of radio coverage is executed by the radio station.

* * * * *